US010685354B1

(12) United States Patent
Eidam et al.

(10) Patent No.: US 10,685,354 B1
(45) Date of Patent: Jun. 16, 2020

(54) AUTOMATIC TELLER MACHINE GAME-BASED AUTHENTICATION FUNCTIONALITY

(71) Applicant: Wells Fargo Bank, N.A., San Francisco, CA (US)

(72) Inventors: Kourtney Eidam, Marietta, GA (US); Andrew J. Garner, IV, State Road, NC (US); Michael Thomas Duke, Monroe, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 16/658,640

(22) Filed: Oct. 21, 2019

Related U.S. Application Data

(63) Continuation of application No. 15/161,543, filed on May 23, 2016, now Pat. No. 10,482,462.

(60) Provisional application No. 62/310,262, filed on Mar. 18, 2016.

(51) Int. Cl.
*G06Q 20/40* (2012.01)
*G07F 17/32* (2006.01)
*G06Q 20/10* (2012.01)

(52) U.S. Cl.
CPC ... *G06Q 20/40145* (2013.01); *G06Q 20/1085* (2013.01); *G07F 17/3244* (2013.01)

(58) Field of Classification Search
CPC .......... G06Q 20/40145; G06Q 20/1085; G07F 17/3244
USPC ........................................ 235/375, 379, 380
See application file for complete search history.

(56) References Cited

U.S. PATENT DOCUMENTS

| 4,671,512 A | 6/1987 | Bachman et al. |
| 5,276,314 A | 1/1994 | Martino et al. |
| 7,575,166 B2 * | 8/2009 | McNamara ............ G06Q 20/18 235/379 |

(Continued)

FOREIGN PATENT DOCUMENTS

CN 103473517 A 12/2013

OTHER PUBLICATIONS

"U.S. Appl. No. 15/161,528, Advisory Action dated Jun. 17, 2019", w/ Examiner Interview Summary, 4 pgs.
"U.S. Appl. No. 15/161,528, Examiner Interview Summary dated Nov. 15, 2018".

(Continued)

*Primary Examiner* — Paultep Savusdiphol
(74) *Attorney, Agent, or Firm* — Schwegman Lundberg & Woessner, P.A.

(57) ABSTRACT

In an example, a method for implementing gamification in user authentication operations for a customer financial transaction device such as an automatic teller machine (ATM) or kiosk may be provided to improve security and enable enhanced electronic display and user interface features. In one example, the electronic operations for implementing gamification may include associated actions in a user interface authentication screen with defined gamification functions, receiving and evaluating input in the user interface authentication screen, and enabling or performing certain authentication actions based on an expected gamification action. In further examples, the gamification may be implemented based on themes for the user interface that match entertainment themes, individual games, or customizations to graphical and text content established by the user.

21 Claims, 12 Drawing Sheets

(56) References Cited

U.S. PATENT DOCUMENTS

| | | | |
|---|---|---|---|
| 8,881,245 B2* | 11/2014 | O'Connor | G06F 21/36 |
| | | | 726/4 |
| 8,943,580 B2 | 1/2015 | Fadell et al. | |
| 10,482,462 B1 | 11/2019 | Eidam et al. | |
| 2002/0103027 A1* | 8/2002 | Rowe | A63F 13/12 |
| | | | 463/39 |
| 2003/0186732 A1* | 10/2003 | Viglione | G07F 17/32 |
| | | | 463/7 |
| 2005/0009600 A1* | 1/2005 | Rowe | A63F 13/12 |
| | | | 463/29 |
| 2006/0131408 A1* | 6/2006 | McNamara | G06Q 20/18 |
| | | | 235/440 |
| 2009/0116757 A1 | 5/2009 | Neogi et al. | |
| 2009/0228380 A1 | 9/2009 | Evanitsky | |
| 2010/0156811 A1* | 6/2010 | Long | G06F 3/044 |
| | | | 345/173 |
| 2013/0196734 A1 | 8/2013 | Cage | |
| 2014/0052595 A1 | 2/2014 | Zimmer et al. | |
| 2014/0096196 A1* | 4/2014 | O'Connor | G06F 21/36 |
| | | | 726/4 |
| 2016/0071371 A1 | 3/2016 | Pececnik | |
| 2017/0330418 A1* | 11/2017 | Link | G07F 17/3258 |

OTHER PUBLICATIONS

"U.S. Appl. No. 15/161,528, Final Office Action dated Mar. 11, 2019", 16 pgs.

"U.S. Appl. No. 15/161,528, Non Final Office Action dated Oct. 9, 2018", 9 pgs.

"U.S. Appl. No. 15/161,528, Response filed Jan. 9, 2019 to Non Final Office Action dated Oct. 9, 2018", 14 pgs.

"U.S. Appl. No. 15/161,528, Response filed Jun. 6, 2019 to Final Office Action dated Mar. 11, 2019", 14 pgs.

"U.S. Appl. No. 15/161,528, Response filed Jul. 3, 2019 to Advisory Action dated Jun. 17, 2019", 11 pgs.

"U.S. Appl. No. 15/161,543, 312 Amendment filed Oct. 10, 2019".

"U.S. Appl. No. 15/161,543, Non Final Office Action dated Apr. 1, 2019", 16 pgs.

"U.S. Appl. No. 15/161,543, Notice of Allowance dated Jul. 10, 2019", 11 pgs.

"U.S. Appl. No. 15/161,543, PTO Response to Rule 312 Communication dated Oct. 17, 2019", 2 pgs.

"U.S. Appl. No. 15/161,543, Response filed Jun. 27, 2019 to Non Final Office Action dated Apr. 1, 2019", 13 pgs.

"U.S. Appl. No. 15/161,528, Notice of Allowance dated Nov. 7, 2019".

"Application Serial No. 15 161,528, PTO Response to Rule 312 Communication dated Jan. 21, 2020", 2 pgs.

* cited by examiner

AUTOMATIC TELLER MACHINE GAME-BASED AUTHENTICATION FUNCTIONALITY

RELATED APPLICATIONS

This application is a continuation of U.S. patent application Ser. No. 15/161,543, filed May 23, 2016, which claims the benefit of U.S. Provisional Patent Application Ser. No. 62/310,262, filed Mar. 18, 2016, and titled "AUTOMATIC TELLER MACHINE GAME-BASED USER INTERFACE FUNCTIONALITY," and is related to U.S. patent application Ser. No. 15/161,528, filed May 23, 2016, and titled "AUTOMATIC TELLER MACHINE GAME-BASED TRANSACTION FUNCTIONALITY", each of which are incorporated by reference herein in their entirety.

TECHNICAL FIELD

Embodiments described herein generally relate to electronic processing activities occurring in computer system-based user interfaces, and in particular, but not by way of limitation, to configurations and techniques for implementing user interface features in a computerized device such as an Automatic Teller Machine.

BACKGROUND

Automatic Teller Machines (ATMs) are commonly used to perform a variety of banking and other financial transaction functions with customers. ATMs include various electronic input and output devices to receive and provide information to a customer, for use in conducting the various financial transactions. For example, many ATMs include a display screen to present a user interface on a touchscreen display to control the performance of the financial transaction, as the touchscreen receives the commands and inputs from the customer for performance of the financial transaction. Existing user interfaces deployed on ATMs with touchscreen displays may involve the use of on-screen buttons, keypads, and keyboards, and graphical and text outputs. However, such user interfaces are often limited in functionality and provide a static display of information.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Figure 1:
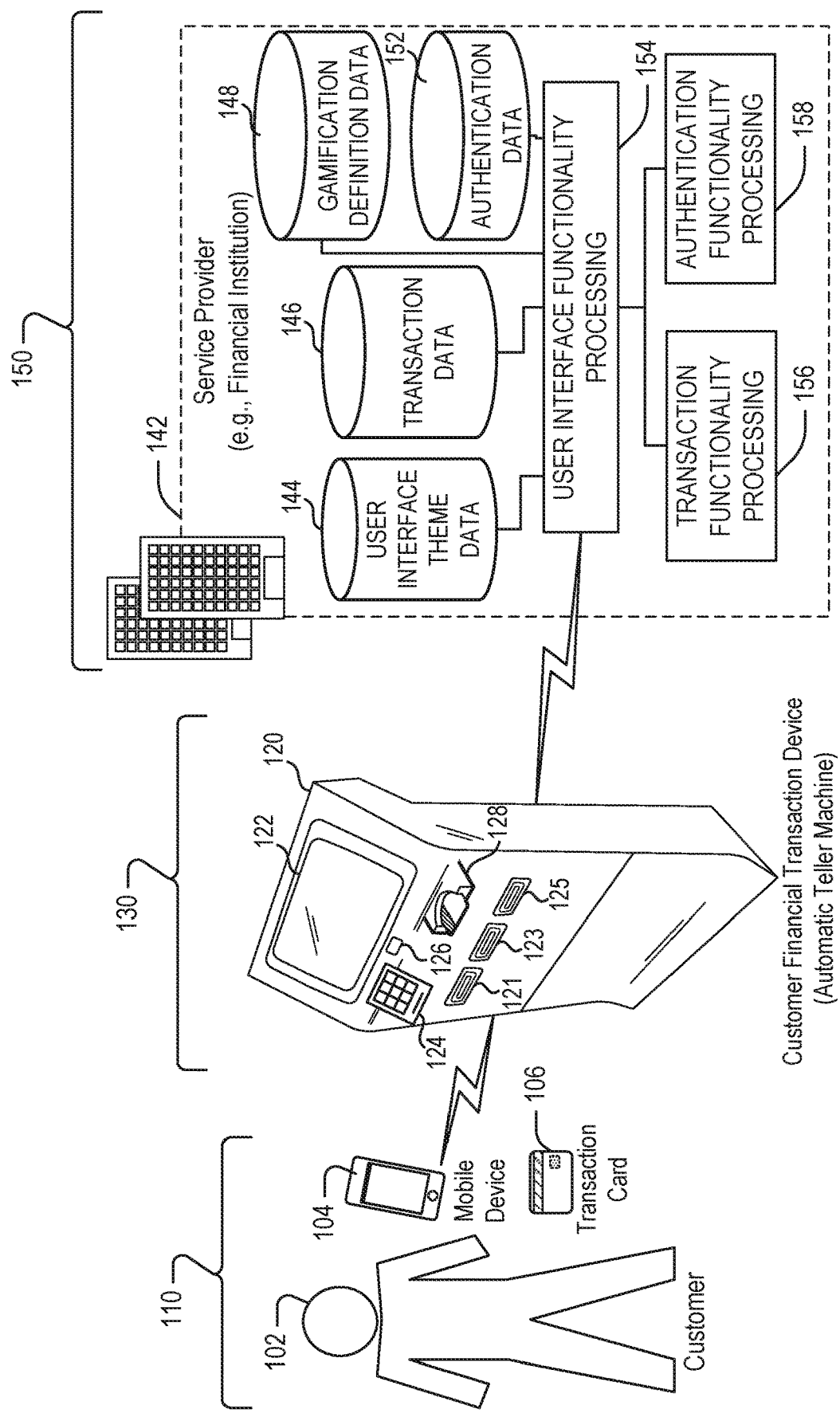
FIG. 1 is an illustration of a computer processing environment depicting gamification operations and interactions among a user, an ATM, and a remote service provider, according to various examples.

In the following description, for purposes of explanation, numerous specific details are set forth in order to provide a thorough understanding of some example embodiments. It will be evident, however, to one skilled in the art that the present disclosure may be practiced without these specific details.

In various examples described herein, configurations and techniques for implementing game-based features of financial transaction user interfaces in an ATM, kiosk, or like customer-operated computing device are disclosed. These features, further referred herein as "gamification", may include aspects of game play, game rules or strategies, themes, or special effects, such as may be implemented in the input or output features of a user interface. Such features to gamify the user interface may be used to provide a dynamic and interesting interaction for the human user, while also implementing technical enhancements and improvements to the electronic operation of the computing device. Such technical enhancements may include security and authentication verifications, personalized or customized inputs and outputs (including user interface themes), and like enhancements to the electronic operations and human input/output transactions performed by the user interface and by the associated computing devices.

In an example, one or more techniques may be implemented to gamify a user interface screen using a predefined set of rules known for a common game or recognizable to a large user population (e.g., what could be considered a "popular" game). In an example, a technique may be implemented to gamify the login experience and authentication process at a touchscreen computing device (e.g., ATM) for customers based on game functions and game play activities of this commonly known game. In various examples, this may include the use of gaming themes and interactions in the user interface from licensed or trademarked games, gaming themes and interactions that occur based on the rules of well-known public domain games, or the use of new versions of games that a human user is capable of easily understanding and participating in.

In another example, a technique may be implemented in a user interface to provide login and authentication functionality through gamification actions and responses. In various examples, gamification features of a user interface may be used to mask or hide the existence (or result) of security verification operations, including features of multifactor authentication (such as to select a specific game piece or game action that the user knows, in addition to an item that the user presents). Further, gamification features of a user interface may integrate security verification operations such as stealth biometric measurements (e.g., fingerprint capture or facial recognition) or other personal authentication techniques into a user-friendly interface.

In another example, a technique may be implemented in a user interface to associate and perform certain financial transactions using gamified responses and activities received from users. For example, a user may indicate a certain transaction on a mobile device ahead of time, and receive a notification of a gamification action (such as movement of a symbol or graphic according to a set of game rules) that must be found and performed on the user interface to conduct the transaction. If the same symbol or graphic is not interacted with, the transaction may be rejected or require additional security measures. As a result, gamification may provide an extra level of verification and security that is easy and intuitive for an intended user to remember, but hard for an unintended user to guess.

In another example, a technique may be implemented in a user interface to provide gamification features during a log-in, security question, or other authentication challenge presentation of a user interface. For example, the entry of information such as a personal identification number (PIN) or a security question answer may be performed through user inputs (and game play) within a game scenario or game board, including a game that has dynamic game states (such as a game that cannot be easily captured, perceived, or reproduced).

One or more of the preceding examples may be implemented in combination in a user interface, according to any operable combination of the examples described in the following text. Thus, the following headings describing the preceding examples in detail are provided for organizational purposes and not for limitation, as it will be clear that many of the following examples of gamification are usable in combination with one another.

Gamification System Operations

FIG. 1 is a diagram of a technological environment for implementing various gamification operations and interactions with an example user interface according to an example. This environment includes the depiction of gamification functions at one or more devices, including an ATM device and mobile computing device. Each of these devices, and similar devices that present a user interface for operation by a customer, are collectively referred to as a "customer financial transaction device". It will be understood that some types of customer financial transaction devices, such as a mobile device or computing system, may be owned and operated exclusively by the customer; other types of the customer transaction financial devices, such as an ATM or Kiosk, may be owned by a financial institution but operated by multiple customers (e.g., for an ATM or Kiosk located in a public place for use by respective users at separate times).

The electronic operations that are performed in the environment of FIG. 1 include customer interaction operations 110, financial transaction device operations 130, and service provider operations 150. The various operations 110, 130, 150 may implement gamification features separately or in conjunction according to the techniques described herein. As one example, a customer 102 may initiate a cardless transaction at an ATM 120 that uses gamification features initiated with a mobile device 104 to authenticate the customer 102. As another example, the customer 102 may operate a user interface generated by the service provider 142 that includes gamification features to assist operation of transactions in the ATM 120. Other forms of the customer interaction operations 110, financial transaction device operations 130, and service provider operations 150 (including other gamification features provided by third parties) may also enable the performance of the gamification actions described herein.

The customer financial transaction devices depicted in FIG. 1 include the mobile device 104 such as a smartphone in the possession of the customer 102 and the ATM 120 accessible to and operated by the customer 102. For example, as described in the scenarios herein, the customer 102 may interact with the ATM 120 using a transaction card 106 (e.g., ATM card, smart card, credit card, or identification card) to perform a financial or information transaction (e.g., cash withdrawal, deposit, account transfer, or information retrieval from account). As another example, the customer 102 may interact with the ATM 120 for a cardless financial or information transaction with presentation of the mobile device 104, a personal identifier or value input by the customer 102, biometric information of the customer 102, or the like. The ATM 120 then performs appropriate electronic transactions with the service provider 142 (e.g., a financial institution such as a bank) to implement one or more financial and information transactions on behalf of the customer 102.

The ATM 120 may feature a variety of electronic and electromechanical inputs and outputs to interact with the customer 102. These inputs and outputs may include a graphical user interface output on a display 122. The display 122 may be a single-point or multi-point touchscreen able to receive touch input from a customer at the ATM 120. The display 122 may be polarized or have a polarized filter disposed on it to provide security by limiting the viewable angles. The display 122 may have portions that are touch-enabled and other portions that are not touch-enabled. The hardware features of the ATM 120 and the display 122 support the presentation and capture of gamification user interface features with the customer 102, according to the techniques described herein.

The other inputs and outputs of an ATM 120 may include a keypad 124 to input alphanumeric information (such as a password, personal identification number (PIN), or like personal identifier code); a card reader 128 to electronically read a card presented by the customer 102 (such as presentation of the transaction card 106), and a camera 126 to capture a photo or video of the customer (as well as audio information, in some examples). The ATM 120 may also include one or more of a bill dispenser 121, a receipt printer 123, a bill acceptor 125, and a scanning device (not shown), housed in (or exposed from) a cabinet. The card reader 128 may support various card types, including but not limited to EMV cards, Magcard, integrated circuit (IC) cards, radio frequency (RF) cards, MIFARE® cards, and the like. The card reader 128 may use magnetic signals, optoelectronic signals, or rear card signals to receive card data from a card. Bank cards, credit cards, drivers' licenses, and other types of cards may be deposited in the card reader 128 for a customer to access a financial account. Other types of contact and contactless cards may also be supported by the card reader 128 and the ATM 120.

The bill dispenser 121 may operate to dispense currency, banknotes, or other items, such as sheets of stamps. The receipt printer 123 may be a thermal printer able to output statements, transaction receipts, error reports, and the like. The bill acceptor 125 may be a four-way insertion acceptor, able to receive and scan banknotes, checks, deposit slips, or the like. The scanning device may be a bar code scanner, Radio-frequency identification (RFID) card reader, passport reader, biometric reader (e.g., fingerprint scanner, retinal scanner, or face imaging unit), IC card reader, or the like. In addition, the ATM 120 may have other input and output devices, such as a microphone, speakers, USB port, wired or wireless networking radios, coin acceptors, backup power supplies, and the like.

The ATM 120 performs its operations using communications with the service provider 142 (such as a financial institution maintaining one or more financial accounts for the customer 102). The service provider 142 may maintain and operate a set of databases or data collections for implementation of gamification data in the ATM 120. These may include the use of user interface theme data 144 to implement gamification themes such as specific graphical content and definitions (e.g., rules) in the user interface of the customer financial transaction device; transaction data 146 to establish gamification actions that are associated with certain transactions that can be performed in the user interface of the customer financial transaction device; gamification definition data 148 to provide specific requirements and attributes for performing and responding to gamification actions; and authentication data 152 to provide security-based functions for user interface login or authentication operations using gamification. These data collections are used by user interface functionality processing 154 to generate gamification features of the user interface and define outcomes for the interaction of the customer 102 with the user interface (e.g., displayed by the ATM 120).

Additional features for implementing gamification from the service provider 142 include transaction functionality processing 156 to generate and respond to gamified user interface transactions, and authentication functionality processing 158 to generate and respond to gamified user interface authentication operations. It will be understood that the processing components 154, 156, 158 may be implemented through a computer system or configured circuitry (e.g., configured by specialized software or hardware of a computer system). It will also be understood that the data stores 144, 146, 148, 152 may be implemented through tangible representations on storage devices (e.g., configured by specialized storage hardware). Although certain circuitry, systems, and databases for implementation of gamification are emphasized in the service provider operations 150, it will be understood that a variety of other data stores and processing circuitry may be used to conduct or enable the financial transaction.

To use the ATM 120, the customer 102 may approach it and present the transaction card 106 such as a bankcard. The customer 102 may insert the bankcard into the card reader 128 or present it to a contactless reader (not shown). The display 122 may update the display to present a personal identification (PIN) pad or password entry. The customer 102 may then provide a PIN or password using a touchscreen of the display 122, using gamification techniques described herein. Upon authenticating the customer, the display 122 may then present one or more options for the customer, using gamification techniques. The options may include various types of financial transactions, such as depositing or withdrawing funds from a financial account. The gamification techniques described herein may be used for multiple user interface features of authentication and transactions, using the authentication functionality processing 158 and the transaction functionality processing 156.

While the examples or discussion herein may refer to a customer, it is understood that the term "user" and "customer" may be interchangeable, such as when a user who uses an ATM is also a customer (e.g., a consumer) of the financial institution for the financial accounts accessed via the ATM. Additionally a user may be a person who has an add-on card or a subsidiary account (e.g., a child), and may not technically be the customer of the financial institution. Thus, the references to user and customer may be considered interchangeable in many examples based on the context of the discussion.

Figure 2:
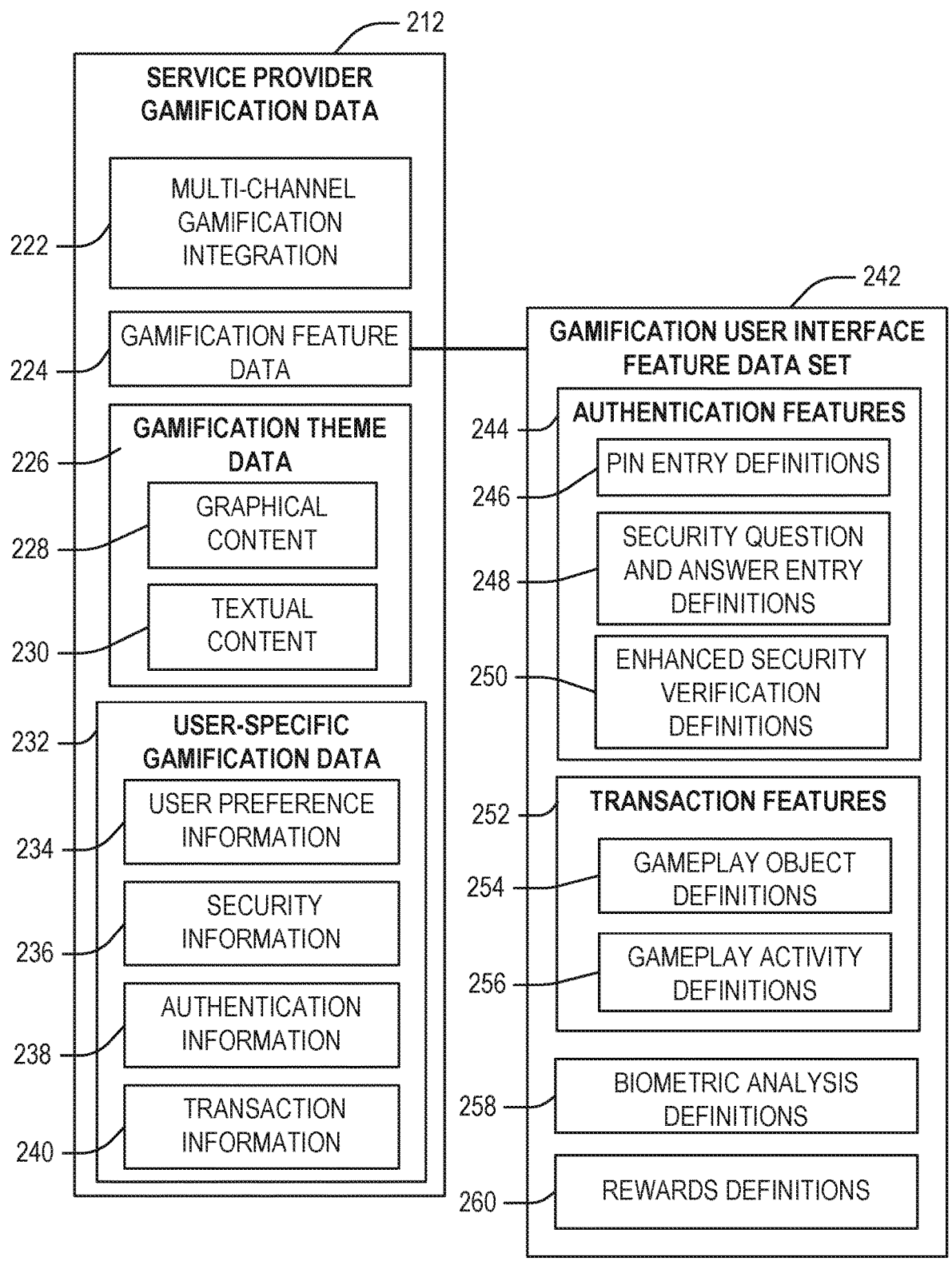
FIG. 2 is an illustration of data maintained for implementation of gamification operations and interactions in a user interface of a customer financial transaction device, according to various examples.

FIG. 2 includes a block diagram of the data values and attributes used to implement gamification in user interface functionality, according to an example. These may include a service provider gamification data set 212 defined to be hosted or accessed by a service provider, and a gamification user interface feature data set 242 also to be hosted or accessed by the service provider but being specific to a certain gamification theme or feature set.

The service provider gamification data set 212 may include a set of data values and definitions that define multi-channel gamification integration 222, such as for the use of gamification themes and outputs in a first channel (e.g., a website interface) and a second channel (e.g., a mobile device software app). The service provider gamification data set 212 may also include gamification feature data 224 which defines a plurality of gamified interaction features in a user interface (further explained in the gamification user interface feature data set 242), gamification theme data 226 which defines graphical content 228 and textual content 230 within a gamification theme, and user-specific gamification data 232 which includes preferences, rules, and other definitions for the use of gamification with individual users. The user-specific gamification data 232 may include user preference information 234, security information 236, authentication information 238, and transaction information 240, each set of information being customized or associated with the user.

The gamification user interface feature data set 242 may include authentication features 244 used for defining the gamification interaction for an authentication (e.g., a login, PIN, password, security question or answer, or like prompt) conducted using gamification, transaction features 252 used for defining the gamification interaction for a transaction (e.g., a financial action implemented by an ATM), biometric analysis definitions 258 used for measuring and verifying biometric data obtained during or proximate to gamification, and rewards definitions 260 used for issuing and tracking rewards based on user interface interaction. The authentication features 244 are depicted as including PIN entry definitions 246, security question and answer entry definitions 248, and enhanced security verification definitions 250, although fewer or additional authentication functions may be implemented with gamification. The transaction features 252 are depicted as including gameplay object definitions 254 and gameplay activity definitions 256, although fewer or additional transactions may be implemented with gamification.

In an example, user interface gamification may be implemented through active simulation of a gaming scenario (e.g., a board game simulation) in a user interface session provided by a financial transaction interaction device such as an ATM. This gaming scenario, which may appear to the end user as a form of amusement or entertainment, may also be accompanied by technical enhancements for improved security or processing purposes. Thus, the implementation of a gaming scenario in a user interface for a customer financial transaction device may offer technical benefits beyond customer satisfaction and loyalty.

Figure 3:
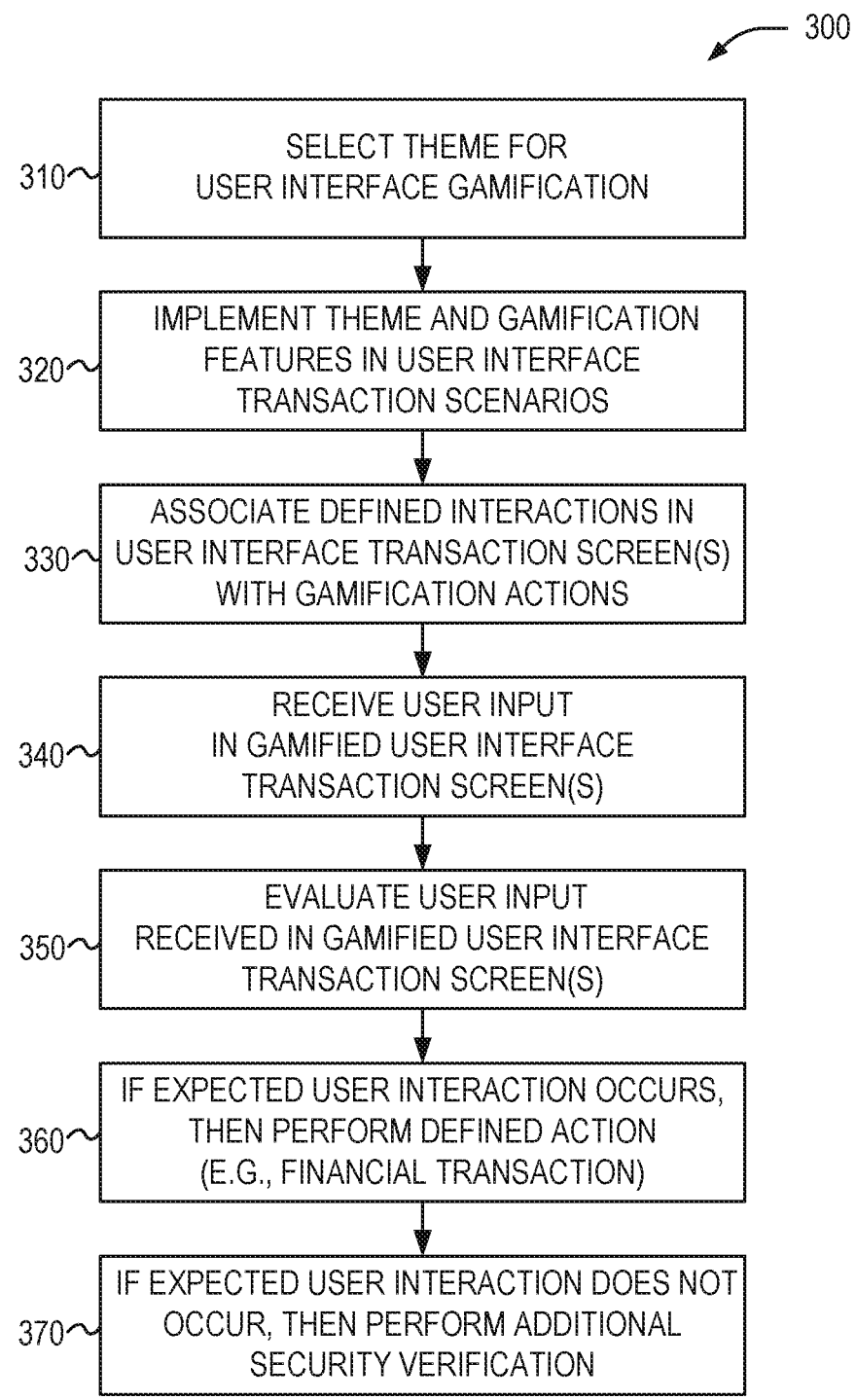
FIG. 3 is an illustration of a flowchart for a method of implementing gamification in transaction user interface actions of a customer financial transaction device, according to various examples.

FIG. 3 includes a flowchart 300 for a method of implementing gamification in transaction user interface actions of a customer financial transaction device, according to an example. This gamification may occur after initial steps which involve the selection of a theme for user interface gamification (operation 310) by the customer or by a service provider. The implementation of the theme, including textual and graphical features of the theme, and gamification features, including user interface activities and responses consistent with the theme, may be deployed in various user interface transaction scenarios (operation 320). Additional user interface transaction scenarios are described in the following sections, but as an example, a transaction may include a customer-initiated request to withdraw a certain amount of cash from an ATM, which is presented in a gamified user interface screen. In these gamified user interface screens, defined interactions (such as user-driven game play events corresponding to ATM actions) are associated with gamification actions and requirements (operation 330).

After gamification features are established in the various transaction screens, user interactions (e.g., input in the ATM or other computing system) is received in one or more of the gamified transaction screens (operation 340). The user interactions that are received are evaluated to determine whether the expected input has occurred in the gamified transaction screen (operation 350). If the expected user interaction occurs (e.g., the customer performs a certain action in a game with a designated game piece) then a defined action (e.g., withdraw and dispense cash from a financial account) may be performed (operation 360), whereas if the expected user interaction does not occur (e.g., the customer performs a different action in the game or uses a non-designated game piece) then additional security verification may be performed (operation 370). This additional security verification may be in the form of another security question, a capture of biometric information, or even requiring the customer to re-authenticate the session.

Figure 4:
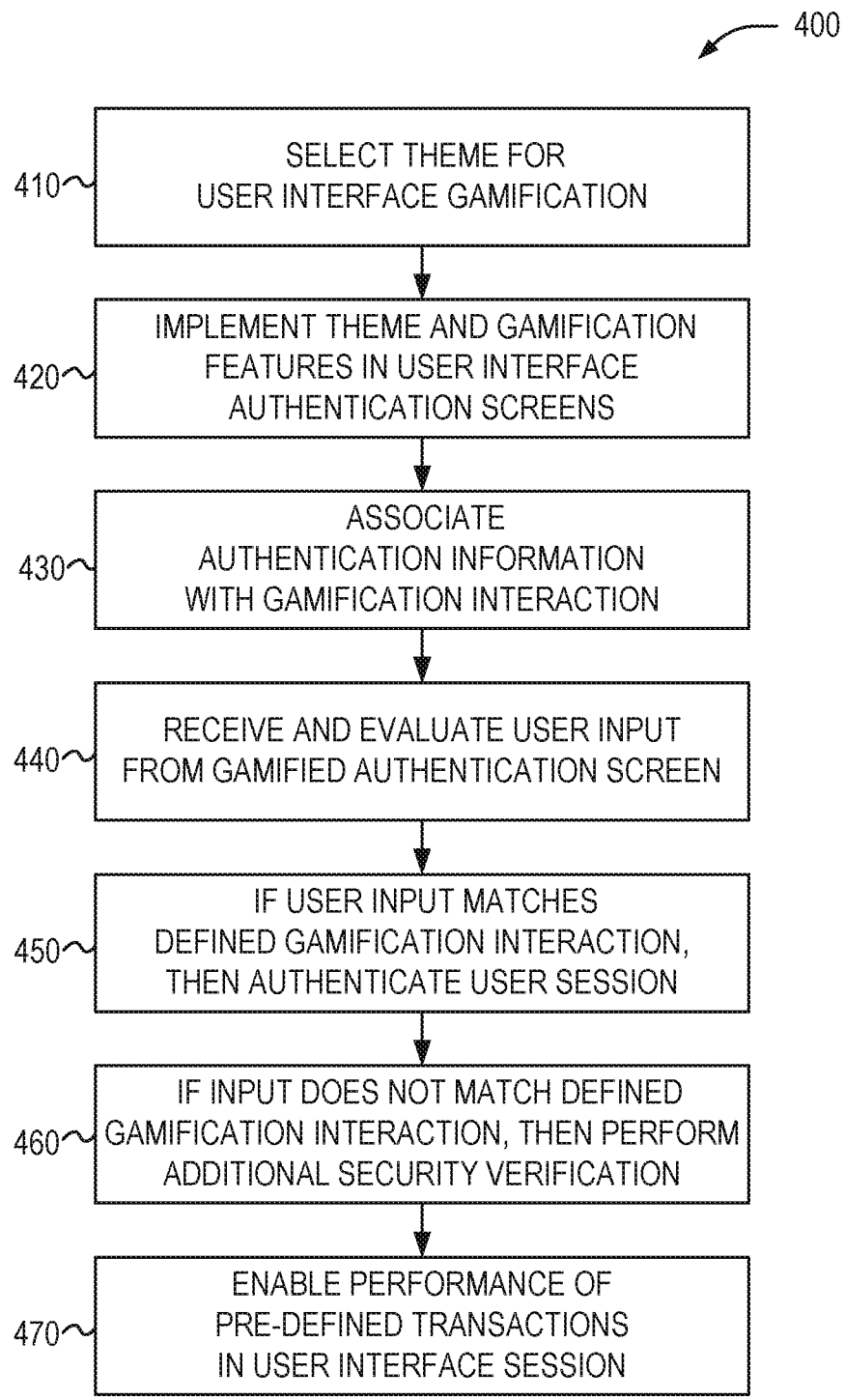
FIG. 4 is an illustration of a flowchart for a method of implementing gamification in authentication user interface actions of a customer financial transaction device, according to various examples.

FIG. 4 includes a flowchart 400 for a method of implementing gamification in authentication user interface actions of a customer financial transaction device, according to an example. In a similar manner as expressed in FIG. 3, this gamification may occur after initial steps which involve the selection of a theme for user interface gamification (operation 410) by the customer or by a service provider.

The implementation of the theme, including textual and graphical features of the theme, and gamification features, including user interface activities and responses consistent with the theme, may be deployed in various user interface authentication scenarios (operation 420) such as in a security question screen, in a PIN entry screen, or concurrently with a transaction screen. Additional user interface authentication scenarios are described in the following sections, but as an example, an authentication may include a customer input screen to receive information that the customer knows, input in a gamified user interface screen. In these gamified user interface screens, authentication information (such as game play events corresponding to ATM authentication inputs) are associated with gamification user interactions and requirements (operation 430).

In a gamified authentication screen, user input is received and evaluated (operation 440) according to the characteristics of the user interface and the gameplay interaction. If the user input matches a defined gamification interaction that corresponds to an authentication action (e.g., matching an expected input), then the user session may be authenticated (operation 450). If the user input does not match the defined gamification interaction (e.g., an unexpected input occurs, or no input occurs), then additional security verifications may be used (operation 460). Upon successful authentication or successful use of the additional security verifications, the performance of transactions (e.g., predefined transactions) may be conducted in the user interface (operation 470).

In connection with the previously described technical environments, various gamification functions may be implemented for user interface presentations and operations. The following sections describe features of customer user interface interactions, user interface themes, security and authentication features, and transactions, which may be implemented through gamification. The following techniques may be implemented upon various embodiments of the preceding devices, systems, or machines; and with use of various embodiments of the preceding data structures, networks, and infrastructures.

User Interface Themes

The gamification actions may be implemented on a user interface of a financial transaction device through the use of themes. In an example, customers may create or select a unique theme "skin" that is presented to perform operations in a gamified user interface of a customer financial transaction device. In an example, the user interface theme may include a skin that corresponds to a game or gaming theme. In other examples, the user interface theme may include a skin customized to features of other promotions, activities, sporting teams, brands, and the like. The implementation of user interface themes may be performed across multiple channels in which a user interface is available. Thus, while such themes may be used for specific game play activities, such themes may also be deployed in other user interface scenarios including in those that do not directly involve or apply game play and game rules.

In an example, the user interface is deployed in multiple channels (e.g., in an ATM, mobile device, and website visits) and is themed based on a common set of gamification features. Features of a theme (and accompanying game play or gaming features) can be customized to the customer, the account holder, or a group of customers, and provided in the user interface whenever the customer accesses into various aspects of a service provider's information services. For example, a common theme may be deployed for a customer of financial institution for interactions with mobile banking, online banking, at an ATM, for insurance/mortgage accounts, for 401K or retirement accounts, and for other accounts/tools from the financial institution. This "multi-channel" theme may provide the customer with clear security benefits to authenticate the source of the user interface, as the customer can observe expected dynamic features of a common theme as the customer is intending to perform financial transactions across different devices. (For example, if the theme doesn't match the user's designated theme, the user will know immediately that he or she has accessed a fraudulent site or interface and can take action in a timely manner).

Figure 5:
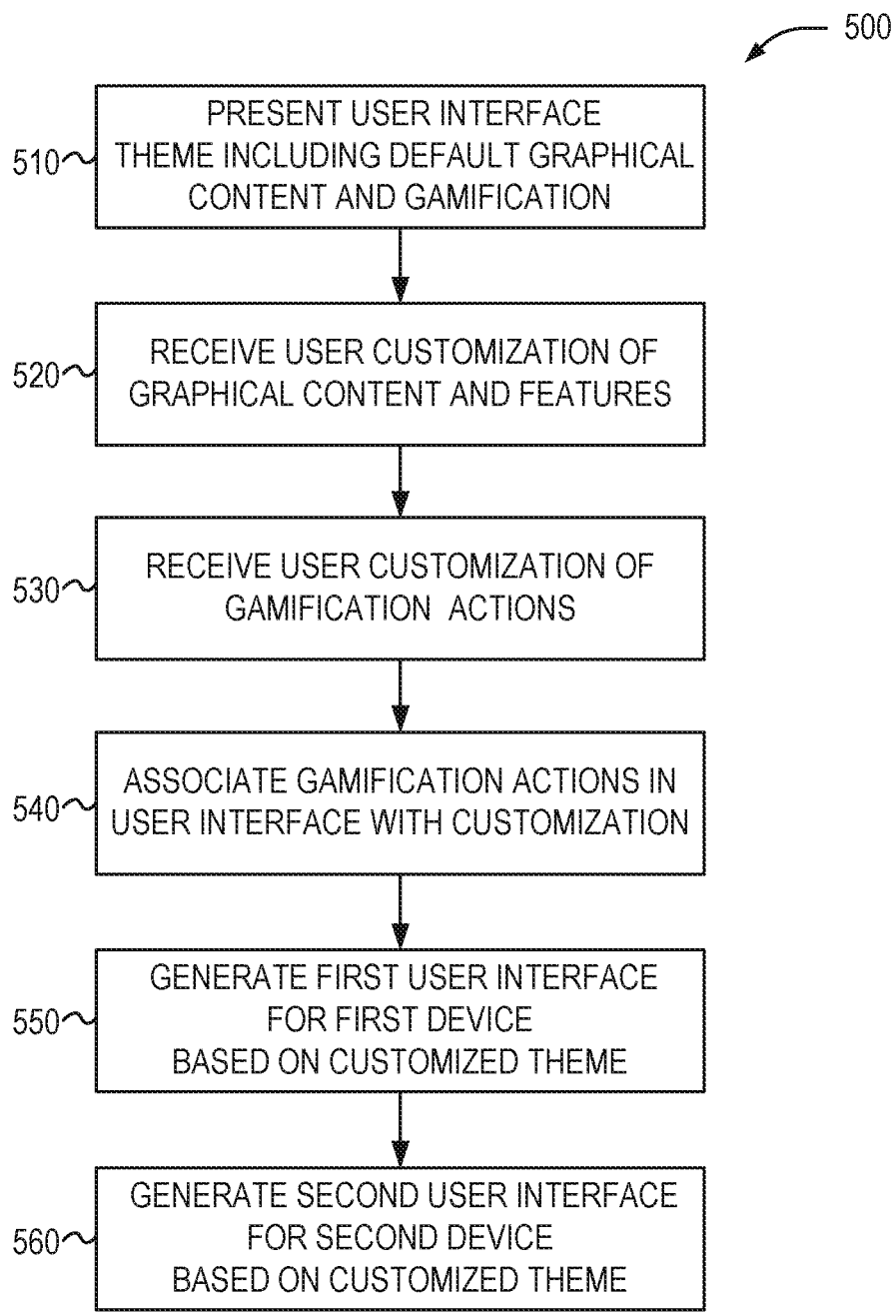
FIG. 5 is an illustration of a flowchart of selecting and implementing a gamification theme in a user interface of a customer financial transaction device, according to various examples.

FIG. 5 includes a flowchart 500 of operations for selecting and implementing a gamification theme in multiple user interfaces for presentation by a customer financial transaction device, according an example. As shown, flowchart 500 includes the presentation of a themed user interface including default graphical and text content and gamification features associated with the theme (operation 510). The gamification theme may receive customization from a customer user for various graphical and text content (operation 520) as discussed below, and also receive customization from a customer user for various gamification actions (operation 530). The implementation of the customization will further include associating gamification actions in a user interface with the customer-specified changes (operation 540). Some of the customer-specified changes may include: assigning images or graphics in place of graphics; receiving themed user interface control changes (e.g., for buttons, tabs, pins); receiving customer-provided graphics (e.g., photos) for use in the user interface; receiving selections of custom game characters, avatars, or game pieces; and the like.

The implementation of the customized theme may allow the customization of the user interface across multiple channels. For example, this may include the generation of a first user interface for a first device (e.g., a desktop browser interface) based on the customized theme (operation 550) and the generation of a second user interface for a second device (e.g., a mobile app interface) based on the customized theme (operation 560). This customization may occur with common elements of a theme that are grouped into a skinned theme (including automatically modified or generated graphical elements to fit the elements of the user interface medium).

Skins of a theme may be deployed based on a combination of graphical and text content. For example, skins may be used to create a customized background and application/user interface features that are unique, but uniform, to the customer across multiple channels. Additionally, the skins may be provided according to levels of customization to be matched to a customer's creativity and interests. For example, a customer may be enabled to create an entirely personalized skin by uploading photos and designs, as well as choosing the colors/patterns of everything from the background, to the tabs, to even the symbols that appear at log in on a touchscreen.

In another example, themes may be extended beyond predefined gaming themes and gaming rules, to defined sets of user-customized content. The customer may implement a custom theme based on a defined set of photos, graphics, colors, or thematic elements. For example, a customer may supply and choose a custom photo such as a picture of a child's artwork for use as the background of a user interface screen. The customer may also supply or choose the colors of user interface tabs or controls to match the artwork. Such content files, content definitions, or content selections (including content in an object definition files) may be previously or newly provided by the customer.

In another example, a customer may provide pictures of the customer's children or pets, assigning each one a number and an order of selection. As a security question, the customer may be asked to arrange the pictures in a specific order (such as order of birth), for use in as an authentication input in lieu of a traditional PIN. When presented with a PIN entry screen at a login at an ATM or with a mobile app on a mobile device, the customer may simply touch or rearrange the images of the children or pets in a defined order. Such pictures may also be integrated with customized aspects of a theme for other authentication or transaction operations. In a further example, a customer can assign or designate images, including custom images, to a numerical equivalent. For example, a customer can assign a number to each image (such as pictures that represent dates or ages of events or people) to create a traditional numerical PIN that can be used at a point of sale terminal, or at ATMs of other financial institutions that do not use the themed images for log-in.

For customers who choose a lesser level of customization, the user interface may present a selection of pre-themed backgrounds, characters, buttons, designs, and other graphics to choose from (or that can be mixed and matched) to create a multichannel skin. For example, available content may be provided from popular/licensed themes, or even generic and internal content (e.g., created by marketing or staff designers). For example, a customer may choose themes such as a HARRY POTTER®, MONOPOLY®, HELLO KITTY® or even a NFL® football team to be their skin theme.

Using a HARRY POTTER® theme as an example for a multi-channel financial transaction interface, the customer may select Hogwarts as the background (or a solid color) and then choose themed buttons/tabs for respective actions. For example, these may include a "Bill Pay" operation, available in both browser or mobile device interfaces, or a $300 Cash withdrawal (on an ATM interface) that appears on a "wand" or "spell book" instead of on a plain text option. The customer may choose a default for multiple tabs to this design or they may manually choose each design for each tab. As an alternative to a numeric PIN entry, a customer may arrange or select photos or illustrations of characters of the theme in order, such as from most favorite to least favorite photo or character.

A customer's theme may also be provided through content from a mix of favorite entertainment movies, sports, video games, etc., including a variety of licensed themes such as HARRY POTTER®, HUNGER GAMES®, DR. SEUSS®, and other designs. The content may also be provided by a generic theme such as a "sports" theme or a generic football or basketball theme. Gamification features and multimedia aspects may be chosen and customized based on the theme, and the theme skins can be applied to other applications, products, and services with the provider. As an example, when a customer begins a text or video chat session with a service provider representative, the image that appears to be chatting could be Harry Potter, Mr. Monopoly, or a custom image set by the user (e.g., of the user's pet). As another example, when a chat session is initiated, the preselected avatar, a photo, or theme graphic can be displayed to the user to allow the user to confirm identify of the representative in the chat session (and to provide confidence that the user is connected to the representative in a secure fashion).

As further integration of the selected themes, skinned debit, credit, or smart cards, checks, and other real world and virtual items may also be issued. For example, the financial institution may issue a card that includes an image from a custom theme, and the card will be analyzed by a camera for an image match verification when the card is presented at an ATM or kiosk. As another example, the card or real-world item could include a graphic or hologram in a unique design that is not visible or perceivable to a human, but is visible to the camera, as an additional validation.

The use of gamification and customized themes may be extended for use across multiple channels and user interface features. Not only does this allow the customer to have a personalized experience, but it also can help prevent fraud and phishing attempts. For example, if a customer visits or attempts to log into a website that they believe is legitimate but the customer doesn't recognize a selected theme, the customer can determine that something is wrong and can take steps to prevent theft/fraud. A detailed user-customized theme may not be capable of being reproduced by another party without access to a detailed specification file maintained by the financial instruction, providing an additional level of security not available with existing user interfaces. Additionally, because the user-customized theme is programmable, the user could specify a number of variations along with a predefined cycle for changing themes. Such variations may be tied to automated randomization or cycling, to add additional difficulty that prevents fraudulent replication of the interface.

Use of a theme and theme skin may be based on a defined time period or user preferences. The service provider, for example, could offer a particular game theme for a period of time, such as quarterly, and the customer may receive notification (SMS, email) about a change to the game theme, and instructions for logging on and selecting or obtaining a game piece for use in the game theme (e.g., used to perform a gamified user interface transaction). In another example, a customized theme may be consistently presented to the user, and the user may see this customized theme until he or she decides to switch to another theme.

The following sections provide detailed examples for uses of gamification with user interface authentication and transaction operations, including examples of themes based on popular entertainment games. It will be understood that applications of gamification may also be used with other types of themes that do not directly involve game play actions or defined rules from a game. Thus, the implementation of gamification in a customer financial transaction device may involve themes and user interface features beyond the use of what the customer considers to be a "game" or game-themed.

Gamification-Based User Interface Transactions

In an example, specific gamification features and activities that are tied to game play scenarios or game play themes may be implemented in the user interface of a customer financial transaction device. For example, authentication of a specific user or access to a specific function on the customer financial transaction device may result from a selection of a correct game piece when multiple game pieces are available or performance of a certain game action when multiple actions are possible. In a similar fashion, the use of additional security measures or an authentication denial may result from a selection of an incorrect game piece or failure to perform a certain game action.

Also in an example, a gaming theme may be implemented in connection with rewards or additional activities or transactions within a user interface session provided by the customer financial transaction device. For example, customized rewards may be tied to game play, selected "winning" transactions, or milestones reached as a result of user interaction activity within the user interface. In a similar example, a gaming theme or select gameplay activities may be automatically launched in the user interface depending on the type of financial transaction, and the identity or preferences of the user. Such gameplay activities may include activities that are specific to a customer preselection of the game or a gameplay object/action, or an automated selection of the game or gameplay token based on a context of the transaction.

Additionally, biometrics may be verified through game play actions occurring in a user interface session on the customer financial transaction device. For example, a fingerprint scan, retinal scan, or other biometric verification may be initiated and performed in connection with (e.g., during, concurrently with, simultaneously with, or proximate to) certain gameplay operations. For example, such biometric verifications may be performed for gameplay operations in which the customer focuses his or her attention on the screen, or touches the screen. Some of the gameplay operations may be designed to increase the amount of time of user attention (for retinal scanning and the like), touchscreen contact (for fingerprint or pressure scanning and the like), or other interaction with the customer financial transaction device, occurs in order to have enough time to allow for the biometric verification to be performed.

Other types of security features may be implemented through gamification of the user interface features. These security features may include requiring a customer to indicate a correct combination, order, or arrangement of game play objects (e.g., game play squares) touched or interacted with by a user. Gamification of the user interface features may also enable certain functions on a temporary or restricted basis. For example, gamified user interface features may be associated with a third party, such as to provide a customer-approved non-account holder with specific game play objects that grant temporary access to a financial account or otherwise enable limited or restricted functions. For example, an approved alternate user may be allowed to perform a specific function within an account, using a temporary identifier or code in addition to use of a unique game piece or game move. The use of unique game piece or game move would provide activation of a one-time function that will occur in response to entry of the temporary identifier or code-such as to dispense a certain cash amount (e.g., $100).

Accordingly, the implementation of gamification features in a user interface may reduce the incidence of fraud/theft, provide limited or restricted access to features for a third party, and increase customer engagement with the financial transaction device hosting the user interface. Further, the implementation of gamification features may be used to increase the chance of capturing biometric information, security video, or other session data from the user interaction with the financial transaction device.

Figure 6:
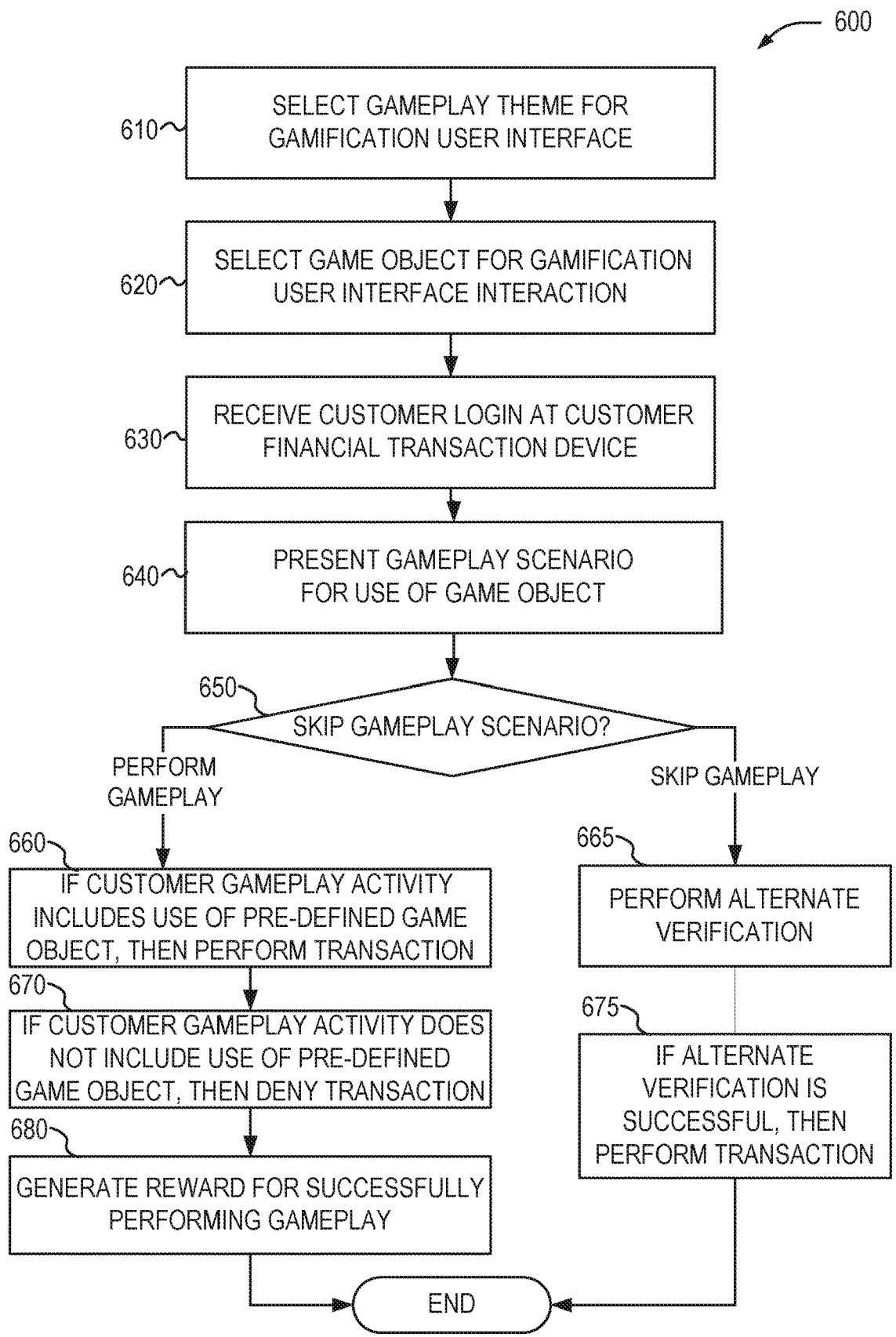
FIG. 6 is an illustration of a flowchart of detailed operations for selecting a transaction using gamification user interface features in a customer financial transaction device, according to various examples.

FIG. 6 illustrates a flowchart 600 of detailed operations for selecting a transaction using gamification user interface in a customer financial transaction device, according to an example. As an initial operation, a selection and implementation of a gameplay theme is established for use in the gamified user interface (operation 610). A further selection and implementation of a gameplay object for user interface interaction is also established for use in the gamified user interface (operation 620). This selection of the theme (e.g., the selection of a particular game such as MONOPOLY® when other "decoy" games are available) and the gameplay object (e.g., the selection of a gameplay token or character in the game such as the Monopoly Car when others are available) may occur as a result of customer influence, selection, or preference (e.g., with a prompt to select the user's favorite game or game piece), or by the service provider (e.g., to randomly designate the game or the game piece for the specific user).

The operation flow continues with the user interface receiving a login from the customer at the customer financial transaction device (operation 630) and a presentation of a gameplay scenario in the designated game for use of the designated gameplay object (operation 640). The presentation of the gameplay scenario may be accompanied by a "Skip" or "Cheat" option to bypass gameplay for customers in a hurry. If the gameplay is skipped (as a result of determination 650), alternate actions including the performance of an alternate security verification may be performed (operation 665), such as with use of an additional security question or challenge, and if the alternate security verification is successfully responded to by the user, then the user interface transaction may be selected and performed (operation 675). As another example, if the gameplay is skipped, a standard (or default) graphical interface may be displayed to the user.

If the gameplay is performed, then the result of the transaction will be dependent on the gameplay activity and the appropriate interaction in the gameplay scenario. For example, the transaction may be performed if the gameplay activity includes the use of the pre-defined game object (operation 660), whereas the transaction may be denied or rejected if the gameplay activity does not include the use of the pre-defined game object (operation 670). Additional game-based outcomes, such as the generation of a reward for successfully performance the gameplay (operation 680), may accompany the performance of the transaction.

In an example, gamification may be implemented in a user interface through recognizable themes according to a well-known game, such as YAHTZEE!®, SCRABBLE®, or LIFE®, as non-limiting examples of well-known board games with simple rules. For example, a banking financial institution could team up with a popular real-world toy/game company, to create recognizable gamification for a plurality of ATM devices deployed across a geographic area, region, or country. Every month or quarterly (or some other time period) the game could change from one theme to another, such as from a YAHTZEE!® theme to a LIFE® theme, and the like.

The gamification theme may be associated with predetermined information that is selected by or selected for the intended customer user. For example, the customer user may receive an alert (e.g., a push notification from a Mobile Banking app, or a text/email message from an Online Banking service, or the like), announcing the game theme for the next period of time, such as the upcoming month/quarter. The customer user may be directed to select a game piece, avatar, color, symbol, graphic, or some other object from the game, or the customer may be informed which designated game object has been selected for him or her. This game piece then becomes part of the authentication or transaction process. As an example, the customer would later log into the ATM as usual with his or her card and PIN. After login, the ATM screen is themed as the game. However, the customer user then must select the correct game object in the gaming theme in order to proceed with an intended action, otherwise additional security questions or measures are imposed on the financial transaction device.

Figure 7:
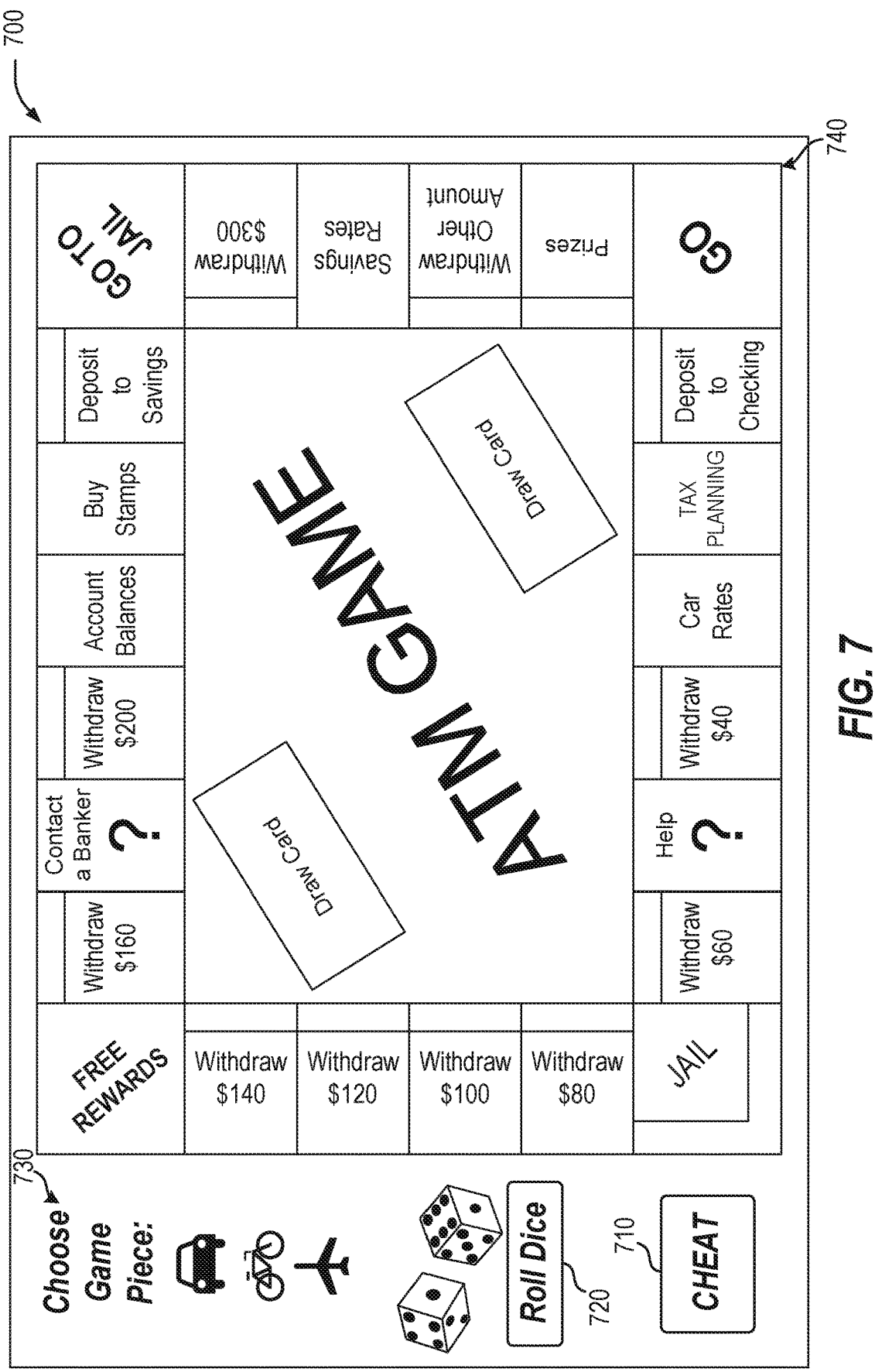
FIG. 7 is an illustration of a user interface for conducting a transaction using gamification user interface features in a customer financial transaction device, according to various examples.

The MONOPOLY® brand property trading game provides a non-limiting example of how a gamification theme could be implemented in an ATM financial transaction device. FIG. 7 illustrates a user interface layout 700 for conducting a transaction using gamification user interface features in a customer financial transaction device, according to an example. As shown, the user interface layout 700 is shaped to resemble the operations of a board game, styled after the MONOPOLY® board game. The actions presented on the game board 740 include a series of selectable options that may be performed in connection with a game action or gameplay event.

Thus, instead of properties such as "Park Place" or a "Railroad" in the squares of the game board 740, the customer may be presented with actions specific to the financial transaction device or the financial account, such as ATM actions (e.g., deposit, withdrawal actions). For instance, one square could be titled "Withdraw $200 Cash" (generated based on this transaction being the most common transaction that the customer performs at an ATM), another square could be titled "Withdraw $100 Cash," another "Deposit," another "Buy Stamps," another "Check Balance" and so on.

In one example, to perform a transaction with the game board 740, the customer first has to select the game piece that has been previously selected (for the customer or by the customer) for this game. For example, if a customer has preselected the "Car" game object but tries to use another game object (e.g., the Monopoly "Dog"), the transaction will be declined, or the customer may be required to perform another authentication step to proceed. If the customer chooses the correct game piece, the customer may then perform some gaming action, such as dragging the game piece to a square on the game board that corresponds to a desired transaction. The financial transaction is then performed in response to the game play activity. This financial transaction and the available game play options provided in the user interface may be enhanced by the use of various rewards and reward schemes.

As a further example, a customer may be required to select a game piece 730 for use with the game (that is pre-assigned to the customer) followed by an option to perform a gameplay action 720 (such as "roll dice") in a particular sequence. In another example, the customer may need to select the particular game destination on the game board 740 prior to performing the gameplay action 720. A "cheat" or "bypass" option 710 may also be presented in the user interface to bypass the use of the gameplay scenario.

There are a number of ways that transactions and game play at an ATM or like customer financial transaction device can be tied into a gaming theme (and accompanied by the generation of rewards). As one example, a simple game play scenario would include the customer dragging a selected game piece to a selected square indicating the desired transaction. When the customer puts the game piece on a square of the game board 740 and releases by removing a finger from the screen, the transaction could proceed or a pop-up can be presented that includes text, such as, "Pass Go. You just collected 100 extra Rewards Points on your Rewards account!" or "Community Chest: You received a 25% discount on your checking account fees this month!" Reward pop-ups could also be randomly presented (e.g., pop up) or could be presented based on milestones, such as choosing the $300 Cash square in your last X number of transactions, or choosing a new square for the first time, for example.

Another example to implement gameplay with the MONOPOLY® theme may involve the use of a gaming activity such as rolling dice (e.g., with the gameplay action 720). For example, the customer selects the game piece 730 and then the piece goes to the Start (e.g., "GO") spot on the game board 740. A dice graphic is presented, which the customer can touch to make it bounce around in place or even across the screen. The customer can then drag the piece to the right square. The dice can be pre-set to always land on the customer's default or most often used square, unless there is a Rewards prize waiting for them. If a Rewards prize is available, then the dice can roll a square such as "Pass Go" or "Community Chest", where the customer will receive a Reward.

Again, the user interface may be designed to allow users to bypass certain gamification interactions or gamification themes. For example, the user interface may include a "Cheat" or "Bypass Game" option 710 (e.g., presented under the "Roll Dice" gameplay action 720), that will let the customer skip the dice roll and proceed to the desired square if the customer is in a hurry or does not care about receiving rewards. Also for example, the customer may land on the "Go to Jail" square, in which case they have to watch/view a product ad to receive a "Get Out of Jail Free" card (and Rewards points). Again, this screen may present a "Cheat" or "Skip" button if the customer wishes to skip this advertisement. In other examples, a mechanism may be presented to bypass the game, rewards actions, or the gaming theme entirely in response to a user input.

As indicated above, rewards can accompany the gamification interactions. Depending on the type of game or gaming theme, rewards can be issued for reaching a certain amount of ATM transactions or interactions, successful log-in attempts, game milestones, etc. The reward type can vary by customer and the products that the customer has (or doesn't) have, such as: an extra percentage point of interest for the month for their interest-bearing savings account, no fees or a discount on fees for checking accounts or other services with fees, a variable amount of extra points for credit cards with a rewards program, or even cash back. Specific examples of activities that may generate rewards could include: completing a training video on retirement savings, interacting with a simulation, or accessing and viewing other educational or promotional content on topics such as investing, budgeting, or kids' financial programs.

In a further example, biometrics can also be integrated with the performance of gamification interactions. Instead of a mundane way to capture biometrics such as dedicated prompts that take time and appear as inconveniences to customers, the capture of biometrics such as a fingerprint, retinal scan, or face recognition, can be presented and conducted within a gamified process. As an example, if the user places a finger on the game piece and moves it across the screen to a desired square (designated by the game), the touchscreen may operate to capture the fingerprint simultaneously. Likewise, because the customer is looking directly at the piece or the board to play the game, a face or retina scan may be performed. In contrast to existing biometric prompts that ask a user to "Put your finger here" or "look here," such biometric capture and verifications can be performed while playing the game or interacting with the device. These types of gamification enhancements makes capturing biometrics seamless, less intrusive, and even amusing to the customer. Further, such biometric operations may be disguised to hide the security validation operations from a fraudulent user, while providing more time to apprehend or initiate additional surveillance actions on the fraudulent user. (For example, a detected potential fraudulent transaction may trigger various camera operations of the ATM or kiosk, or activate devices in proximity to the ATM or kiosk to trigger more cameras or surveillance of the user).

In further examples, the performance of gamification transactions may be performed among multiple games. For example, a customer may select in an online session or in a mobile app which game that he or she wants to play for a time period (or until he or she selects a different one) when next using an ATM. In this interface, the customer may also select the game piece for the respective game. When the customer logs in, the customer is required to select the right game, and the right game piece to proceed, offered as an extra level of authentication.

If a licensed game is not used, gamification features may also be performed with a generic gaming theme. Other variations and customizations of game play may be provided based on the geographic location of the user interface access, or preferences established by the customer. In an example, the customer may provide a preference to opt-out out of all or certain gameplay actions. In other examples, the customer may opt-in to all or certain gameplay actions.

In another example, the financial transaction device may present different games or game themes depending on the transaction type the customer has chosen. This would involve modifications to the game play of the MONOPOLY® gamification theme described above, such as for use with cardless transactions at ATMs. As an example, a customer may select a transaction (and gameplay object or selected game) in advance on a smartphone or device, so that when the customer arrives at the ATM, the ATM would know which game to launch based on the selected transaction. The ATM may perform this association based on geolocation of a customer device, a near-field communication (NFC) with the customer's electronic device, scanning of a QR code or other identifier from the customer's electronic device, and the like. For an extra level of authentication, the customer may be required to select the correct game manually for the pre-selected transaction, select (and, potentially, use) the correct game piece once the right game is launched, and finally enter a PIN as a three-part authentication process.

Again, returning to the example of user interface customized to a MONOPOLY® game theme, the customer may be required to drag the right game piece to the right transaction square, in response to the customer being in proximity to the transaction device. All the other squares could be nontransactional "decoy" squares, but may be labeled with the names of legitimate transactions to reduce the chance of access by someone who is not authorized and does not know the pre-selected transaction or game piece. Once the pre-selected transaction is selected, the customer is authenticated, and the customer may be permitted to choose another transaction.

Other security enhancements may be added through the use of ongoing game play actions, such as a secret "checkpoint" known to the customer that needs to be performed prior to a transaction being processed. For example, in addition to the customer selecting the correct game and/or game piece, the customer may be required to perform a certain game action. In the example of MONOPOLY®, the customer may be required to drag a designated game piece to a certain game board location, e.g., "Park Place" or "Water Works", before the pre-selected or desired transaction option can be activated. This secret game board "checkpoint" location could be issued via a notification to the customer device, for example, before reaching the ATM, and may change each time the customer pre-selects a transaction or enables a transaction activity.

In an example, ATM gamification could be extended to allow access for third parties by the customer through online or mobile banking or directly at an ATM. If a customer desires to provide access to a nanny or babysitter, for example, to withdraw cash from the ATM when the customer does not accompany the authorized party, the customer could pre-select (e.g., generate) a temporary PIN, generate a time-limited unique QR code, a temporary game, a temporary game piece, and include any directions, QR codes, pins, or the like, through a text or notification to the authorized party's device.

The transactions that are performed at a customer financial transaction device may also be accessed, initiated, or enhanced through the use of gamification as discussed herein. In an example, a specific financial transaction may be initiated, queued, or performed at a device in response to customer interaction with elements of gamification and game play, provided at the mobile device. For example, a first device (e.g., a mobile phone) may be used to cue up a certain financial transaction ahead of time. The first device may receive a push notification of a symbol or graphic (e.g., interacted with gamification) that the customer must find and touch on the second device (e.g., an ATM) to perform the transaction. Thus, the transaction on the second device is dependent on the information obtained from the first device for an extra level of verification and security.

Dynamic security objects may be used in a customer financial transaction device to change in different contexts or "evolve" in a limited space. Decoy symbols can also be used to thwart non-account holders trying to guess the right symbol. For example, a "smart" symbol may be designed to change based on the type of transaction to perform. In one example, after a customer cues up a transaction on a device, the customer receives a contextual symbol in a notification that must be used to verify and perform the transaction. The symbol may be automatically generated for one-time use or could be pre-set or customized to the user. The symbol could be one that is already on ATM screens or it could be one that is added in real time for the specific customer. In a further example, the symbol notification could be presented when the customer's mobile device is in proximity to ATM. (For example, the ATM and mobile device may pair as a first step in authentication, so the ATM knows who the customer should be before the login process begins). The symbol may be dynamically presented somewhere on screen and must be tapped, dragged on, or interacted with in some way. Thus, the correct symbol in addition to the correct order/location may be required in addition to entry of the user's PIN or password.

As an example, to verify the desired transaction with a security object, the financial institution may send a push notification (or SMS text, email message, etc.) of a security symbol or graphic to the customer's mobile device. When the ATM and mobile device connect through geolocation, NFC, QR code, or device-to-device communication, the ATM screen will incorporate that symbol somewhere in its user interface in real time (or may make the symbol actionable in response to the device-to-device connection). The customer may then be required to locate and activate or select the symbol or graphic on the screen, such as before or right after an established PIN entry process. This may include a security symbol or graphic or other object that is part of the usual ATM screen, such as a Piggy Bank illustration, a logo associated with the financial institution, a currency symbol, or the like. The security object could also be a symbol that is added but fits into the general theme of the user interface and does not stand out. Thus, a customer may be required to perform a "scavenger hunt" to find and select a certain symbol or graphic in order to perform a transaction.

As another example of a scavenger hunt activity, a notification could be provided in the form of a simple question or riddle, like "Select the letter that falls between the F and the R in your bank's name," requiring the customer to select the "A". Or, the customer may be requested to "Bring home the bacon by tapping this farm friend," requiring the customer to touch or interact with the piggy bank displayed on the screen before proceeding with a transaction. As another example, as part of a use of dynamic symbols, the user interface could include a pop-up "symbol pad" prior to or following the PIN entry in an ATM interface. This symbol entry could present objects such as a triangle, $ sign, star, car, smiley face, etc., requiring the customer to tap the correct symbol to proceed with a transaction. This symbol may be associated with the customer, a group associated with the customer, or some characteristic known or determinable by the customer.

As another example, the touchscreen ATM could provide an input with a dynamically changing symbol in addition to a PIN. This may require the customer to enter a correct number and correct symbol in the respective entry locations, such as having a first digit of the PIN go into a first box but a dynamically assigned symbol go into the second box. Numbers and symbols may be presented as floating around an input area or fading in and out to allow selection of the dynamically assigned symbol. The customer will receive a push notification of which symbol to select in the input screen and in which spot it must be entered, thus informing the customer of the dynamic symbol input (e.g., a one-time input) to perform a high-risk (or high-value) transaction or to authenticate a session. For example, suppose the existing PIN for a customer is 1234. A notification is received that the symbol for the transaction is a # and that the # has to go into the second entry location. As a result, the code the customer will need to enter is 1#234. The "what" and the "where" of the dynamic symbol input may change for each transaction. Such entry mechanism provides a variably changing input screen and input value, to make it harder for an unintended party to capture the PIN entry.

As another example, instead of dragging or moving numbers on the screen to designated entry locations, there could also be an option for the customer to draw/write the secret code or the dynamic symbol with his or her finger. This mechanism may also be used in connection with pattern/writing recognition as another level of authentication (including, in an example, biometrics or fingerprint recognition). Additionally, the customer financial transaction device could include a pressure pad input to measure other patterns that can be attributed to a certain customer, using as input pressure and timing. Other combinations to enter dynamically assigned symbols for a PIN entry, an authenticator entry, or to conduct a transaction, are also possible.

Further variations to transaction interactions may include an authentication or verification from customer's personal device (e.g., mobile device) that are integrated with gamification actions, such as at a fixed-location customer transaction devices such as an ATM. For example, when an ATM and the customer's mobile device connect after being authenticated, the mobile device could present information to the customer on the mobile device and not on the ATM screen. Further, the mobile device can operate as a PIN/input pad for the customer to select digits, symbols, or enter a password, or to draw either a customized/pre-set symbol or graphic; or, the mobile device may receive a notification to indicate to the customer what symbol or graphic to draw on the ATM screen. Other features provided by the mobile device, including entry of an identifier or use of a fingerprint scanner on the mobile device, may also enable transactions or unlock certain features on the connected ATM device.

Authentication and Security Question Functionality Through Gamification

The presently described gamification techniques also may be used in connection with user authentication operations at a customer financial transaction device such as an ATM. Gamified user interfaces to accept user input may extend to specific operations for the input of login or authentication credentials, or other personalized information (including PINs). For example, elements of a login input, PIN entry, security question answer, or other user input process may be gamified or enhanced through gameplay operations.

Some of the examples of gaming inputs that may be gamified in authentication inputs may include: requiring a user to touch a defined number of graphics in a defined order (including selecting a correct game or game piece to initiate actions) to authenticate; replacing an on-screen login input keypad with moving digits or digits randomly jumbled into a game theme; implementing game-based or non-traditional finger movements and patterns on screen to enter a PIN, identifier, or password; using game-based one-time PIN codes or passwords for lost cards or to authenticate with a financial transaction device in a cardless scenario; entering answers to security questions in a game-based word search; providing a preselected color or pattern (or theme) to be chosen along with a set of correct digits or characters; and implementing additional features for authentication if an unexpected game result (such as playing with an incorrect game piece) or unexpected transaction occurs.

Figure 8:
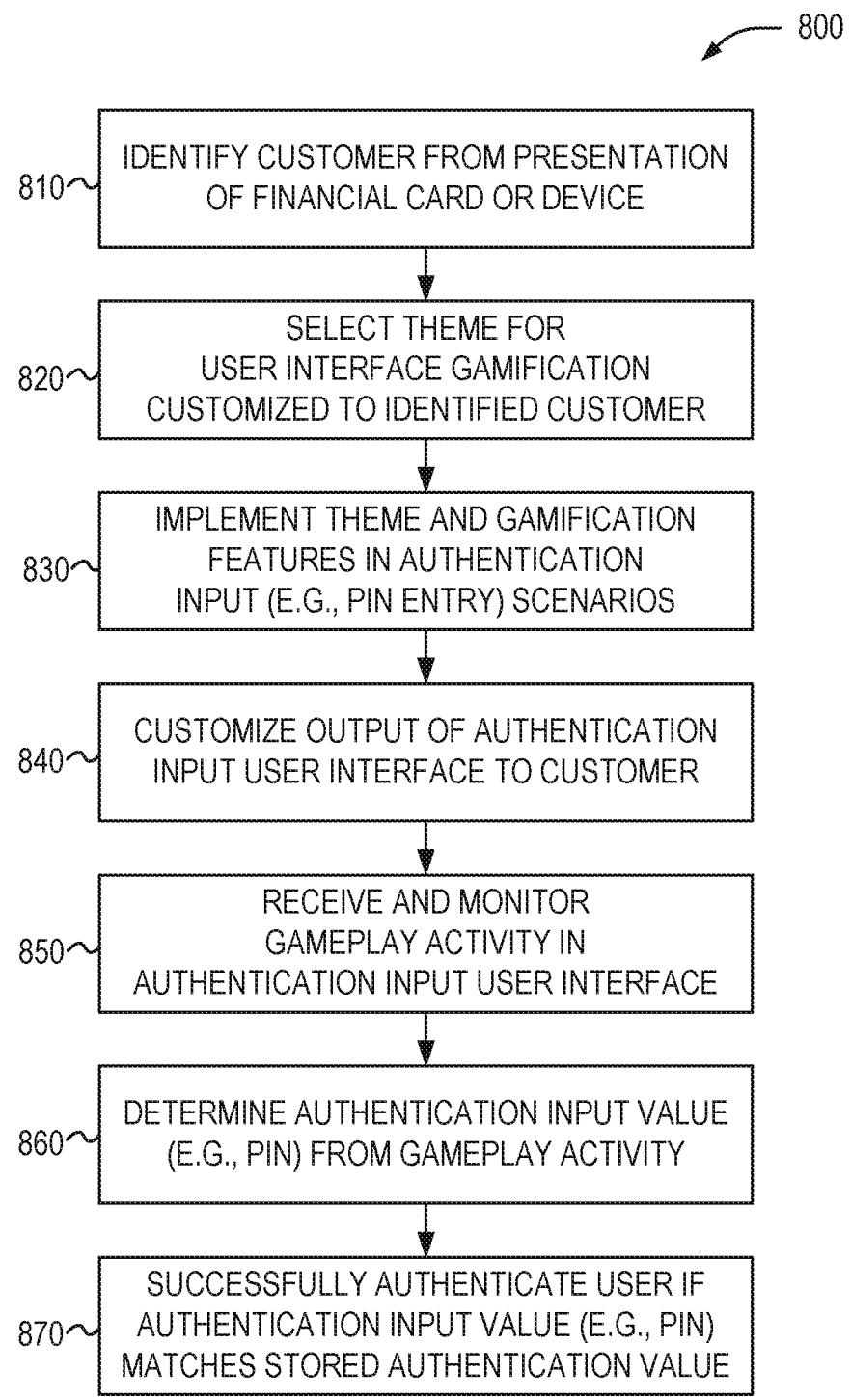
FIG. 8 is an illustration of a flowchart of detailed operations for performing an authentication operation using gamification user interface features in a customer financial transaction device, according to various examples.

FIG. 8 illustrates a flowchart 800 of detailed operations for performing authentication operations with gamification in a customer financial transaction device, according to an example. The operations include the identification of a particular customer or customer account from the presentation of a transaction card (e.g., financial card issued by a financial institution) or a device (e.g., a smartphone operating an application of a financial institution) (operation 810). From the identification of the customer, a theme for customized user interface gamification on the customer financial transaction device is selected (operation 820) and implemented in authentication input scenarios (operation 830). Such authentication input scenarios may include a PIN or password entry screen, security question input screen, or like input/output scenarios.

Based on the theme and information for the customer (such as pre-selected or pre-assigned information), the output of the authentication input user interface is customized to the customer (operation 840). The authentication input user interface will then receive (and, in some examples, monitor) gameplay activity in this authentication input user interface (operation 850). The gameplay activity is analyzed and an authentication input value (such as a PIN or password entry) is determined from the gameplay activity (operation 860). If the authentication input value (and any other dynamic input information) matches a stored authentication value or other preselected value established for the customer, the customer may be successfully authenticated (operation 870).

In an example, a PIN entry and authentication process may be modified with a gaming theme, such as CANDY CRUSH®, BEJEWELED®, or TETRIS®, or by using classic/generic games, such as Sudoku or pinball. When a customer logs in at the ATM, he or she must use a PIN and a card (or a present a device or other identifier in a cardless scenario). To enter the PIN on an existing touchscreen ATM, a keypad pops up on the screen and presents 0-9 in a static order on the keypad (often with 1 first on the top row and 0 last on the bottom). If a third party wants to illegally obtain the PIN, the third party can record or closely observe a customer touching the keypad in certain rows and in a certain order to figure out the PIN from the static digit placement on the keypad. However, if the digits on the keypad are not located on a traditional/static keypad or are moving on the screen, it makes it much harder to fraudulently capture the PIN.

Figure 9:
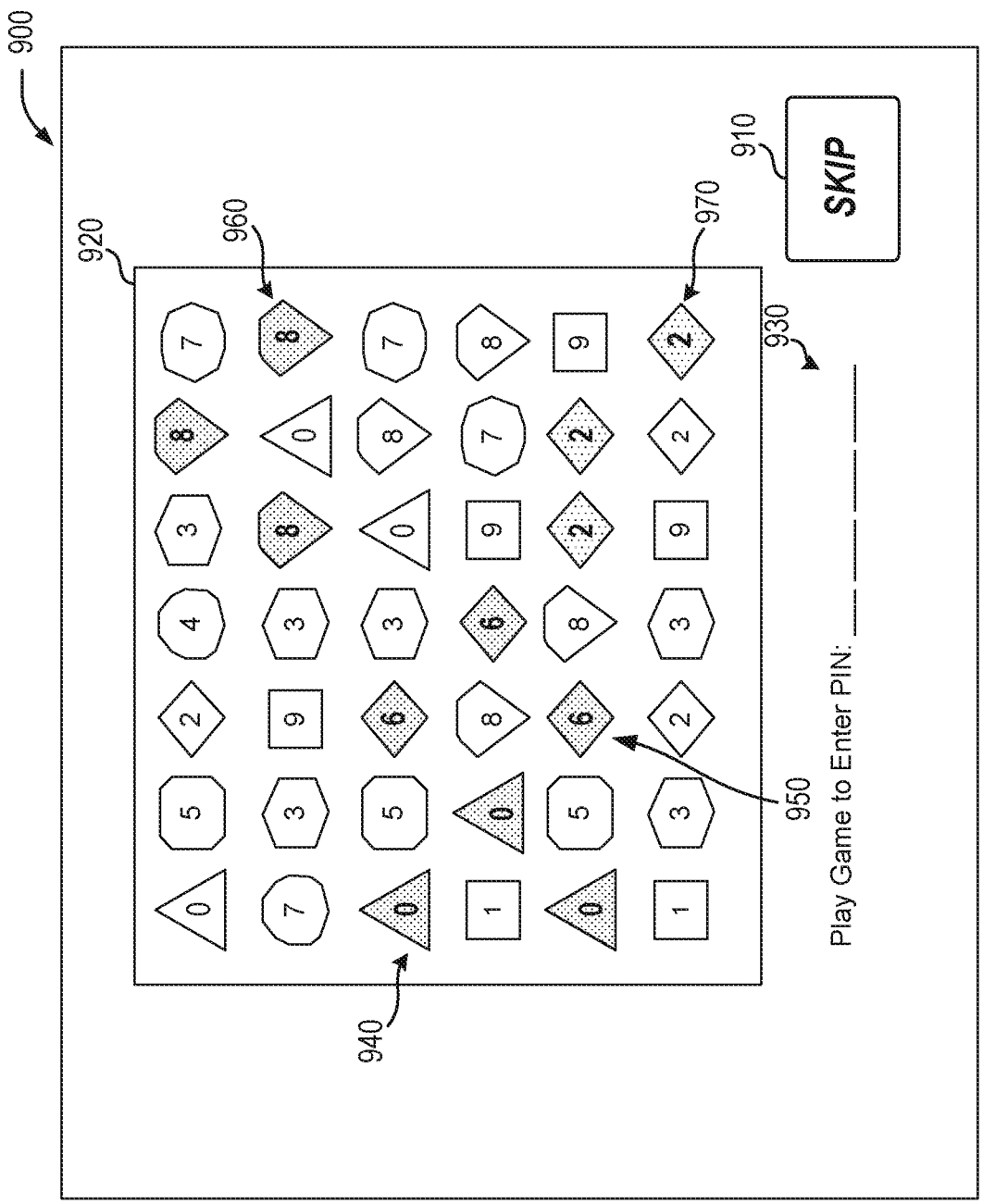
FIG. 9 is an illustration of a user interface for conducting an authentication input using gamification user interface features in a customer financial transaction device, according to various examples.

FIG. 9 is an illustration of a user interface 900 for conducting an authentication input using gamification user interface features in a customer financial transaction device. As an example, the user interface 900 depicts a scenario of game play from the tile-matching puzzle game BEJEWELED®, where instead of numbers being presented on a touchscreen keypad, the numbers may be integrated as part of a game on the screen.

The game screen 920 is configured to receive user interaction via movement of the BEJEWELED® objects, where three or more "jewels" must be lined up in order to serve as entry of a numerical character in a PIN. For example, to provide input in a PIN entry field 930 of a desired PIN "0682", the game objects 940 (highlighted) must be lined up to input a "0", the game objects 950 (highlighted) must be lined up to input a "6", the game objects 960 (highlighted) must be lined up to input a "8", and the game objects 970 (highlighted) must be lined up to input a "2".

Gamification of the user interface 900 may be used to present more "correct" numbers than "wrong" to increase the speed that a user is able to perceive and select a particular combination of objects to input a number. The user may also be provided with a bypass option 910 to "skip" the input of the numbers with gameplay, such as with the use of a traditional input screen or additional security questions. Other variations to the timing, sequence, and selection of the particular PIN numbers (or symbols) also may be implemented.

In another example, continuing with the example of BEJEWELED®, the numbers may appear in jewel graphics of different colors, which appear randomly placed. To log in, the customer would have to touch a jewel with the right first digit of the PIN, drag it to the next jewel with the second digit on his pin, then the third, then the fourth, and so on. When performed in the correct order, the jewels will accompany some indication (e.g., exploding fireworks-style) and the customer will gain entry into the transaction screen. For example, when a customer is attempting to login to an ATM, the ATM knows which numbers are in the customer's PIN after the customer presents a card or electronic device to begin the transaction. The gamification may present more of the correct numbers in the game (e.g., in the jewels) than the wrong ones to help speed up the process (although such information may look like a random combination to a non-account holder).

As another example, in a login styled after TETRIS®, the digits for a PIN may be presented to appear in shapes that fall from the top of the screen. The customer will have to tap/drag the right digits/shapes in the right order to the stack at the bottom. Digits will disappear from the shapes/jewels when touched by the customer. Dynamic and fast movement (and unpredictable inputs from the user) in the game can prevent this and like user inputs from being intercepted by a third party.

For an extra level of authentication, the customer could be required to pre-select a color or shape when attempting to enter the correct PIN code in the game. For example, in BEJEWELED®, the customer may have to pick blue jewels with the correct PIN numbers. If the customer chose a red jewel with the right digit, it would be considered wrong-just as if the customer had picked a blue jewel but with the wrong digit. The selected color could vary by time period (e.g., varying each month) or the selected color could be sent as part of a notification for ATM transactions that are selected in advance or given at initial ATM/device connection. This information may also be sent as part of a push notification to a software app running in the mobile device of the customer, which is detected as being in proximity to the ATM. The game could also be preselected by the customer from multiple game options available.

In addition to the implementation possibilities with trademarked or licensed games such as BEJEWELED® or TETRIS®, generic or classic games could be used. For example, bubbles of different colors with digits in them could be presented to "rain down" on the screen, and the customer has to "pop" the right ones in the right order to successfully enter a PIN. Or, balls (colored with numbers) from a Pinball machine could "bump" around on the screen and the customer would have to touch the right ones in the right order to successfully enter the PIN.

In cases where the customer's transaction card is lost or a cardless transaction is attempted, the customer may cue up a transaction and obtain a one-time, temporary PIN either by a notification received on the customer's device after selecting the transaction or when the customer's device is in proximity to the ATM. In addition to a temporary PIN, the notification may indicate game directions, such as an indication to pick the blue objects or pick the square shaped objects. For a cardless scenario, the customer might also receive a notification with a password, PIN, or symbol for cued up transactions, for example a simple object such as "pineapple". After the device connects to the ATM, a screen could pop up with a word search and the customer would have to cross through "pineapple" with a finger to authenticate his or her identity.

Additional security measures such as alphanumeric passwords and security question answers could be implemented as an extra step if a wrong PIN or symbol combination is entered. The customer may receive a notification on a mobile device that includes a pre-set or customized generic security questions, as the customer is required to find answer to the security question (e.g., a one word answer) in a gamified word search or scramble presented on an ATM screen. Or, the customer may have a preselected password/security answer that can be selected when a word search verification is presented on the ATM screen. In some examples, a pre-cued ATM transaction will be terminated or extra steps will be needed to authenticate if the PIN or symbol combination is entered incorrectly. Further, if the PIN or symbol combination is entered incorrectly, security measures may be elevated, or further measures such as requiring the customer to speak to a customer agent or even temporary locking the customer's account until an authentication question is resolved.

The presently described authentication activity may be involved not only in the entry of an initial login identifier, but also during the session with the customer financial transaction device. For example, specific authentication or verification may be applied during the performance of certain transactions, such as transactions exceeding a certain dollar amount. For example, fund transfers under $100 may not request a special token or impose additional security measures, whereas fund transfers that are $100 or more may need a special token or entry of information in an authentication screen. Likewise, the use of certain game tokens or game actions may prompt entry or re-entry of some information if a security answer is incorrect or if a gamification measure is bypassed. To encourage use of gamification authentication inputs, rewards may be integrated in connection with game-based authentication and verification activity. For example, customers could level up or receive set rewards, earn badges, or even receive real-world rewards after a certain number of successful game log-ins.

In a further example, gamification may be integrated with customizable, multi-media security questions and answers to be used at the customer financial transaction device. A security question and answer session can be used at the traditional card-and-pin ATMs of today but is also useful in cardless ATMs (and that allow customers to cue up transactions in advance) as an extra level of authentication or security. Gamification provides a useful mechanism by which customizable security questions and other authentication challenges can be answered. For example, gamified security questions may provide responses to security questions that are more dynamic, to include authentication values determined from intuitive movements, gestures, images, faces, objects, sounds, or the like, known to the user.

Figure 10:
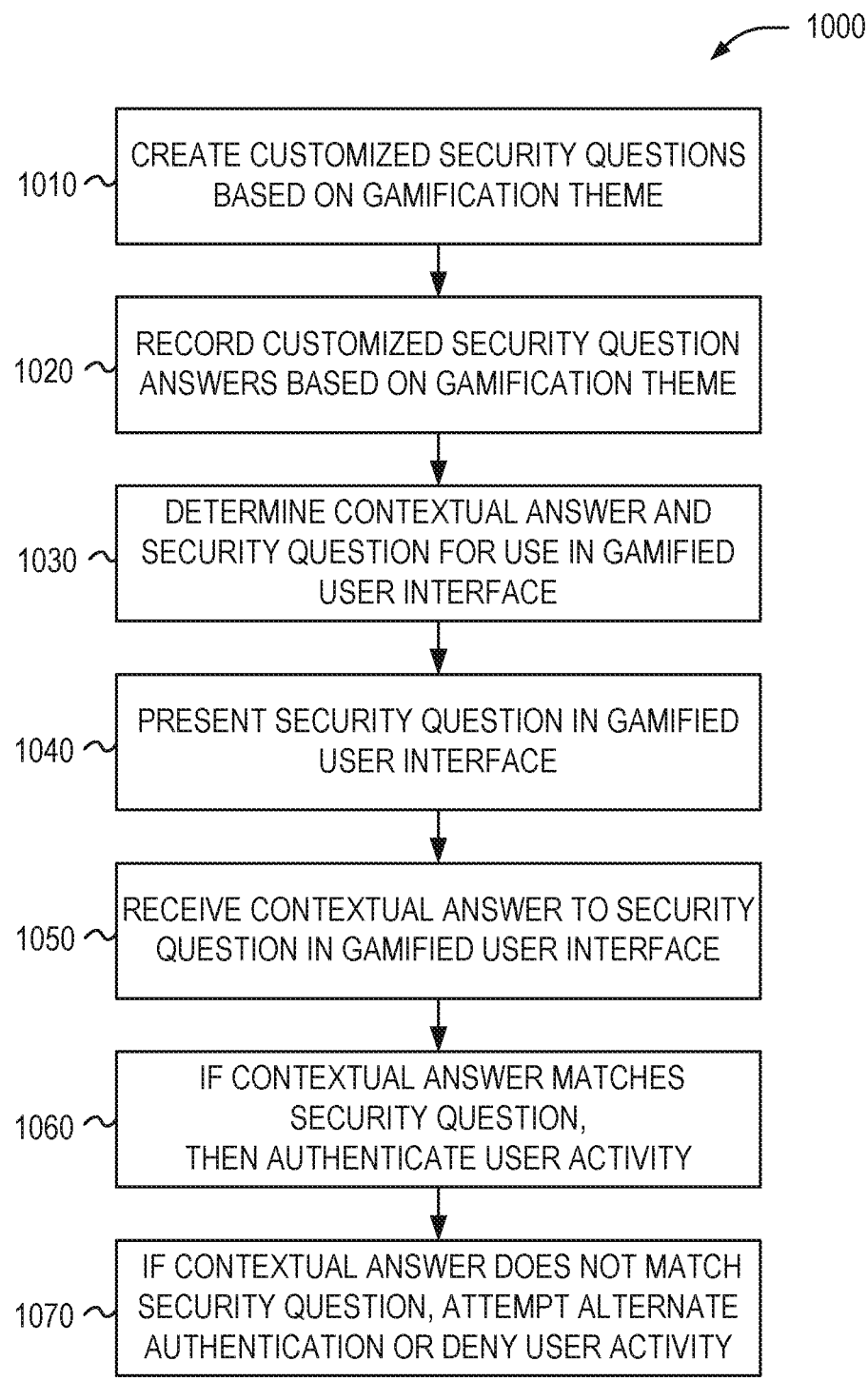
FIG. 10 is an illustration of a flowchart of detailed operations for performing a security question and challenge using gamification user interface features in a customer financial transaction device, according to various examples.

FIG. 10 illustrates a flowchart 1000 of detailed operations for performing a security question and challenge with gamification in a customer financial transaction device, according to an example. The operations of the flowchart 1000 are initiated based on customized security questions created for a gamification theme (operation 1010) and customized security question answers that are recorded for the gamification theme (operation 1020).

Upon the occurrence of an authentication event or other security challenge scenario, a particular security question and a contextual answer are determined for user in the gamified user interface (operation 1030). The particular security question is then presented in the gamified user interface (operation 1040), such as in connection with the gameplay user interaction techniques discussed herein. The user interface then receives a contextual answer to the security question from the user (operation 1050). If the contextual answer matches the security question, then the user activity is authenticated (operation 1060). If the contextual answer does not match the security question, then the user interface may implement additional or alternate authentication techniques, or certain user activities may be denied or restricted (operation 1070).

In an example, when a customer opens a new account with the financial institution or opts into this service, he or she can log in to online or mobile banking to create customized security questions and answers. Unlike traditional text-based responses to security questions, these questions can include a non-text-based response. For example, the customer can establish a security question: What's your favorite sign? As the answer, the customer can record herself on a mobile device or webcam flashing the Peace Sign with her two fingers. If this security question is asked at the ATM, the customer may then provide the Peace Sign to the ATM camera. A box may appear on the original recording device and on the eventual ATM so that the customer lines up the Peace Sign gesture correctly. Gestures and personal activities such as Thumbs up, waving, clapping, making a facial gesture, and other visual cues can also be used.

As another security question, the customer can establish a custom question such as, who is your most loyal friend? To record the response, the customer can hold up a photo of a dog on the customer's smartphone or a real photo of the customer's dog to a webcam/device camera. The customer could even hold up the actual dog to the camera if the dog accompanies the customer to the ATM. A similar answer technique could work with any image or object that the customer has access to serve as a valid response to a security question.

As the third security question, the customer can type in a security question, such as "What has the best taste?" For the response, the customer can record saying "Pineapple" into a microphone/mobile device. Later, at the ATM, the customer would have to speak aloud "Pineapple" when signaled. Such technique may be enhanced by ATMs that include virtual chat features and mechanisms to record sound and recognize voice prints.

In an example, the use of security questions does not need to be performed for all transactions; rather, such security questions may be used in cases where there is a failed log-in attempt or a security issue is detected. For example, in the case of advanced ATM authentication, the ATM device may track dynamic factors, such as patterns, behavior or biometrics, and issue a security question in response to detecting an anomaly. A list of provided questions can also be chosen during account initialization, allowing the customer to customize how they will respond to a customized question. Additionally, if the customer can't answer a customized question (for example, the customer didn't bring a picture of the dog to hold up to the ATM camera), the customer may request another customized question or security mechanism.

Authentication through smart security questions may be presented in connection with many gamification transaction and use scenarios at ATMs. As one example, the security question may be provided to the customer's mobile device, and the customer reaction has to be input or performed in front of the ATM (such as thumbs up to the camera/screen). As another example, the question may appear as scrolling across the bottom of the screen on the ATM and the customer has to provide a response to the ATM. As another example, the question may be provided to a customer device paired with the ATM and the customer action is entered on the customer device, which signals the ATM to authenticate. Other variations to these techniques are possible.

In another example, the security question may be provided from a dynamic question that asks about a recent transaction with the ATM or account, such as "How much did you deposit on Friday?" Additionally security questions based on context, or by asking a question that isn't a question. For example, the question, "What's the response to your security question?" where the customer has a security question and knows what the response should be. Also for example, suppose that a customer has a security question such as "What is your favorite snack?", and after the question is launched, there will be a word such as "APPLE" that needs to be selected before the customer can proceed. This may be provided within a game, in a scenario where the choice is not apparent (e.g. from a picture of a fruit basket), from a paragraph of text, or the like. Other variations to customize and generate security questions such as a favorite pet, a favorite vacation location, or the like may also receive contextual answers.

Device and Computer Implementation Examples

Figure 11:
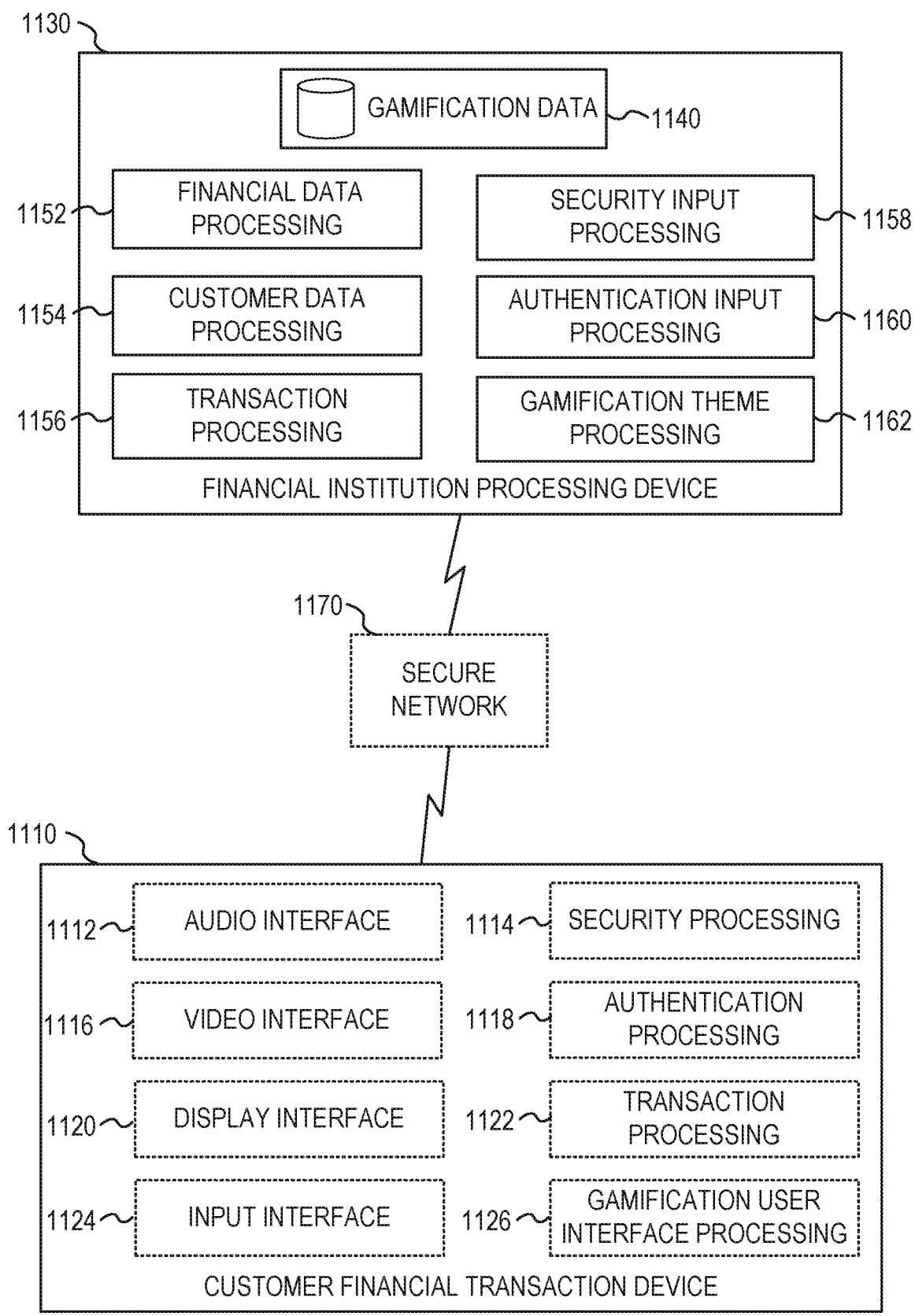
FIG. 11 is a block diagram of components deployed in a customer financial transaction device and a service provider device for implementation of interaction features with gamification user interface functionality, according to various examples.

FIG. 11 illustrates a block diagram of components deployed in a customer financial transaction device 1110 and a service provider (financial institution processing) device 1130 for implementation of the interaction features described above with gamification user interface functionality. It will be understood that the following components may implement the preceding described user interface themes, gamification-based user interface transactions, and authentication and security questions.

The customer financial transaction device 1110 may include a series of interfaces implemented in software-configured hardware (e.g., a computer system, circuitry, or specialized hardware) including an audio interface 1112 to receive and output audio in connection with gamification features, a video interface 1116 to receive and output video in connection with gamification features, a display interface 1120 to receive and output graphical content in connection with gamification features, and an input interface 1124 to receive and process customer input in connection with gamification features. The processing components (e.g., a processor or processing circuitry) that may be operated and used by the customer financial transaction device 1110 may include security processing 1114 to implement security measures with the gamification features, authentication processing 1118 to implement authentication verification with the gamification features, transaction processing 1122 to implement electronic financial and operation transactions with the gamification features, and gamification user interface processing 1126 to implement input and output processing for user interface components that provide the gamification features. The customer financial transaction device 1110 also may include (or access) advanced analytic systems (not shown), which can determine customer preferences for configurations and options and to determine alternative actions based on user responses and actions.

The financial institution processing device 1130, connected to the customer financial transaction device 1110 via a secure network 1170, may implement authentication and transactions, using features of gamification according to the techniques described herein. The processing components (e.g., a processor or processing circuitry) that may be operated and used by the financial institution processing device 1130 may include financial data processing 1152 to implement financial data inputs and outputs via gamification interactions, customer data processing 1154 to implement customer data inputs and outputs via gamification interactions, transaction processing 1156 to perform financial and information transactions based on gamification interactions, security input processing 1158 to process and implement security measures based on gamification interactions, authentication input processing 1160 to process and analyze authentication inputs based on gamification interactions, and gamification theme processing 1162 to implement themes in user interfaces and generated content for gamification. These processing components may be integrated through the use of gamification data and rules 1140 stored in one or more data storage devices to accomplish gamification specific operations (e.g., specific authentication or transaction operations) for a particular session or user.

Figure 12:
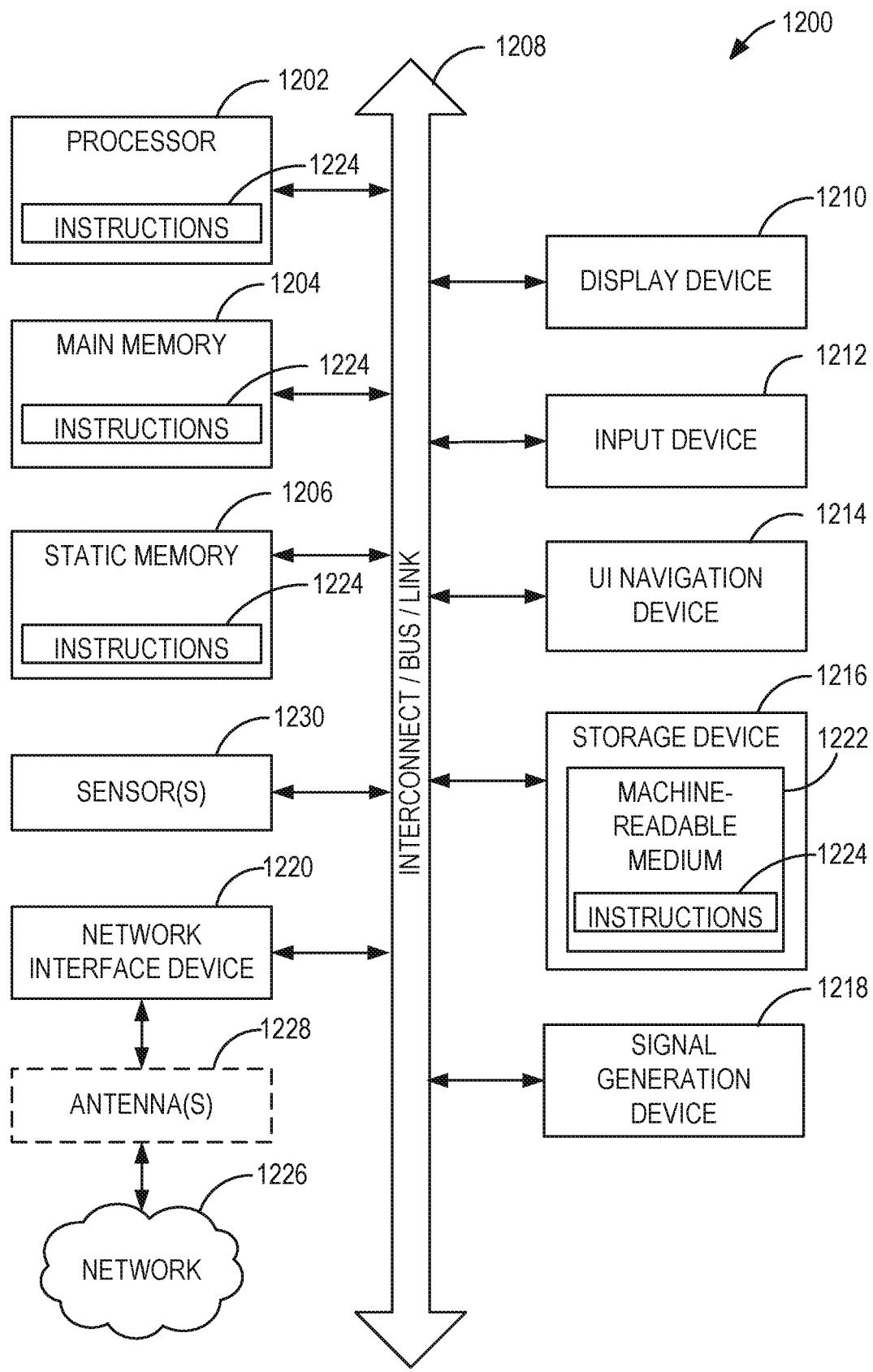
FIG. 12 is a block diagram of a machine in the example form of a computer system within which a set of instructions, for causing the machine to perform any one or more of the methodologies discussed herein, may be executed.

FIG. 12 illustrates a block diagram illustrating a machine in the example form of a computer system 1200, within which a set or sequence of instructions may be executed to cause the machine to perform any one of the methodologies discussed herein, according to an example. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a dedicated terminal (e.g., ATM unit, Kiosk), a personal computer (PC), a tablet PC, a hybrid tablet, a personal digital assistant (PDA), a wireless smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1200 includes at least one processor 1202 (e.g., a central processing unit (CPU), a graphics processing unit (GPU) or both, processor cores, compute nodes, etc.), a main memory 1204 and a static memory 1206, which communicate with each other via a link 1208 (e.g., bus or interconnect). The computer system 1200 may further include a video display unit 1210, an input device 1212 (e.g., an alphanumeric keyboard), and a user interface (UI) navigation device 1214 (e.g., a mouse). In one example, the video display unit 1210, input device 1212 and UI navigation device 1214 are incorporated into a touch screen display. The computer system 1200 may additionally include a storage device 1216 (e.g., a drive unit), a signal generation device 1218 (e.g., a speaker), a network interface device 1220, and one or more sensors (not shown), such as a global positioning system (GPS) sensor, compass, accelerometer, location/proximity sensor, pressure sensor, or other sensor.

The storage device 1216 includes a machine-readable medium 1222 on which is stored one or more sets of data structures, rules, and instructions 1224 (e.g., software) embodying or utilized by any one or more of the methodologies or functions described herein. The instructions 1224 may also reside, completely or at least partially, within the main memory 1204, static memory 1206, and/or within the processor 1202 during execution thereof by the computer system 1200, with the main memory 1204, static memory 1206, and the processor 1202 also constituting machine-readable media.

While the machine-readable medium 1222 is illustrated in an example to be a single medium, the term "machine-readable medium" may include a single medium or multiple media (e.g., a centralized or distributed database, and/or associated caches and servers) that store the one or more instructions 1224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of well-known transfer protocols (e.g., HTTP). The communications with the communication network 1226 optionally may occur using wireless transmissions sent via one or more antennas 1228. Examples of communication networks include a local area network (LAN), a wide area network (WAN), the Internet, mobile telephone networks, plain old telephone (POTS) networks, and wireless data networks (e.g., Bluetooth, Bluetooth Low Energy (BLE), Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Specific implementation examples of the presently disclosed techniques on the computer system 1200 may include all or portions of the following examples in method, machine, and manufacture forms. Each of the following non-limiting examples may stand on its own, or may be combined in any permutation or combination with any one or more of the other examples provided below or throughout the present disclosure.

Example 1 is a method for implementing gamification in a user interface, comprising a plurality of electronic operations executed with a processor and memory of a customer financial transaction device, the plurality of electronic operations including: designating a defined interaction to be received from a user in a gamified user interface transaction display of the customer financial transaction device, the defined interaction provided from input in a game scenario of the gamified user interface transaction display; receiving a user input from the user with the customer financial transaction device during a presentation of the game scenario with the gamified user interface transaction display; evaluating the user input received with the customer financial transaction device to determine whether the user input corresponds to the defined interaction; and performing an electronic financial transaction with the customer financial transaction device in response to determining that the user input received with the customer financial transaction device corresponds to the defined interaction.

In Example 2, the subject matter of Example 1 optionally includes: implementing a theme for the gamified user interface transaction display, the theme defining a plurality of user interface components for the game scenario of the gamified user interface transaction display that enable a performance of the defined interaction.

In Example 3, the subject matter of Example 2 optionally includes wherein the theme for the gamified user interface transaction display is implemented based on user customization of the gamified user interface transaction display, and wherein the theme includes customization of graphical content for the game scenario based on one or more content files or content selections previously provided from the user.

In Example 4, the subject matter of any one or more of Examples 2-3 optionally include wherein the theme for the gamified user interface transaction display is implemented based on service provider customization, wherein the theme includes customization of graphical content for the game scenario with input characteristics and output characteristics established by a financial institution, and wherein the theme is provided for user interfaces of multiple types of devices operated by the user, the multiple types of devices including the customer financial transaction device.

In Example 5, the subject matter of any one or more of Examples 2-4 optionally include wherein the theme for the gamified user interface transaction display is implemented based on rules and graphical content of a defined game, wherein the rules of the defined game are associated with a plurality of defined interactions in the game scenario including the defined interaction to be received from the user, and wherein the gamified user interface transaction display simulates game play of the defined game using the rules and the graphical content in the game scenario.

In Example 6, the subject matter of Example 5 optionally includes wherein the gamified user interface transaction display presents a plurality of selectable options in the game scenario to perform respective financial transactions, wherein the defined interaction includes use of a designated game play graphical object to enable a particular option from among the plurality of selectable options in the game scenario, and wherein the defined interaction includes an action in the game play of the defined game to interact with the designated game play graphical object and enable the electronic financial transaction.

In Example 7, the subject matter of any one or more of Examples 1-6 optionally include: performing a security verification in response to determining that the user input received with the customer financial transaction device does not correspond to the defined interaction; and wherein performing the electronic financial transaction with the customer financial transaction device occurs in response to additionally successfully performing the security verification.

In Example 8, the subject matter of any one or more of Examples 1-7 optionally include: performing a biometrics scan of the user during the receiving of the user input with the customer financial transaction device; and wherein performing the electronic financial transaction with the customer financial transaction device occurs in response to additionally determining that the user is verified from biometric information of the user received with the biometrics scan.

In Example 9, the subject matter of any one or more of Examples 1-8 optionally include wherein the customer financial transaction device is an automatic teller machine or a kiosk, wherein the customer financial transaction device includes a touchscreen display unit adapted to output the gamified user interface transaction display and receive the user input in the gamified user interface transaction display.

Example 10 is at least one machine readable medium including instructions, which when executed by a computing system or other electronic device, cause the system to perform any of the techniques of Examples 1-9.

Example 11 is a machine (e.g., a computer system, automatic teller machine, kiosk, mobile device) including hardware configured to perform any of the techniques of Examples 1-9.

Example 12 is a method for implementing gamification in a user interface, comprising a plurality of electronic operations executed with a processor and memory of a customer financial transaction device, the plurality of electronic operations including: designating a defined interaction to be received from a user in a session with the customer financial transaction device, the defined interaction provided from authentication input in a game scenario of a gamified user interface authentication display; receiving a user input from the user with the customer financial transaction device during a presentation of the game scenario with the gamified user interface authentication display; evaluating the user input received with the customer financial transaction device to determine whether the user input corresponds to the defined interaction; and authenticating the user in the session in response to determining that the user input received with the customer financial transaction device corresponds to the defined interaction.

In Example 13, the subject matter of Example 12 optionally includes: implementing a theme for the gamified user interface authentication display, the theme defining a plurality of user interface components for the game scenario of the gamified user interface authentication display that enable a performance of the defined interaction.

In Example 14, the subject matter of Example 13 optionally includes wherein the theme for the gamified user interface authentication display is implemented based on rules and graphical content of a defined game, wherein the rules of the defined game are associated with a plurality of defined interactions in the game scenario including the defined interaction to be received from the user, and wherein the gamified user interface authentication display simulates game play of the defined game using the rules and the graphical content in the game scenario.

In Example 15, the subject matter of any one or more of Examples 13-14 optionally include wherein the theme for the gamified user interface authentication display is used in an interaction session with a financial institution to confirm validity of the interaction session, and wherein the theme for the gamified user interface authentication display includes a graphical object previously selected or provided from the user.

In Example 16, the subject matter of any one or more of Examples 12-15 optionally include wherein the gamified user interface authentication display presents a plurality of options in the game scenario to perform entry of an personal identification code, the personal identification code including one or more alphanumeric characters or symbols, wherein the game scenario includes respective designated game play objects that select respective alphanumeric characters or symbols of the personal identification code, and wherein the defined interaction includes a user action in a defined game to interact with the respective designated game play objects to cause an input that matches the personal identification code.

In Example 17, the subject matter of any one or more of Examples 12-16 optionally include the plurality of electronic operations further including: performing a security verification in response to determining that the user input received with the customer financial transaction device does not correspond to the defined interaction; and wherein authenticating the user in the session occurs in response to additionally successfully performing the security verification.

In Example 18, the subject matter of Example 17 optionally includes wherein the security verification includes presentation of a security question with the customer financial transaction device and verification of a security answer for the security question to an answer received with the customer financial transaction device, and wherein the answer received with the customer financial transaction device is input by the user based on game objects provided in the presentation of the game scenario.

In Example 19, the subject matter of any one or more of Examples 17-18 optionally include wherein the security verification includes verification of biometric information of the user, the biometric information obtained from a biometrics scan of the user performed during the receiving of the user input with the customer financial transaction device.

In Example 20, the subject matter of any one or more of Examples 12-19 optionally include the plurality of electronic operations further including: performing a device-to-device communication between the customer financial transaction device and a mobile device of the user prior to receiving the user input, wherein the defined interaction is based on information communicated to the mobile device in the device-to-device communication.

In Example 21, the subject matter of any one or more of Examples 12-20 optionally include wherein the customer financial transaction device is an automatic teller machine or kiosk, wherein the customer financial transaction device includes a touchscreen display unit adapted to output the gamified user interface authentication display and receive the user input in the gamified user interface authentication display, and wherein authenticating the user in the session enables performance of a user-controlled electronic financial transaction with the customer financial transaction device.

Example 22 is at least one machine readable medium including instructions, which when executed by a computing system or other electronic device, cause the system to perform any of the techniques of Examples 12-21.

Example 23 is a machine (e.g., a computer system, automatic teller machine, kiosk, mobile device) including hardware configured to perform any of the techniques of Examples 12-21.

The above description is intended to be illustrative, and not restrictive. For example, the above-described examples (or one or more aspects thereof) may be used in combination with others. Other embodiments may be used, such as by one of ordinary skill in the art upon reviewing the above description. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for implementing gamification in a user interface, comprising a plurality of electronic operations executed with a processor and memory of a customer financial transaction device, the plurality of electronic operations including:
    designating a defined interaction to be received from a user in a session with the customer financial transaction device, the defined interaction provided from authentication input in a game scenario of a gamified user interface authentication display;
    receiving a user input from the user with the customer financial transaction device in connection with a presentation of the game scenario with the gamified user interface authentication display;
    evaluating the user input received with the customer financial transaction device to determine whether the user input corresponds to the defined interaction;
    authenticating the user in the session in response to determining that the user input received with the customer financial transaction device corresponds to the defined interaction; and
    performing a security verification in response to determining that the user input received with the customer financial transaction device does not correspond to the defined interaction;
    wherein authenticating the user in the session occurs in response to additionally successfully performing the security verification; and
    wherein the security verification includes verification of biometric information of the user, the biometric information obtained from a biometric scan of the user performed in connection with the receiving of the user input with the customer financial transaction device in connection with the presentation of the game scenario.

2. The method of claim 1, the plurality of electronic operations further including:
    implementing a theme for the gamified user interface authentication display, the theme defining a plurality of user interface components for the game scenario of the gamified user interface authentication display that enable a performance of the defined interaction.

3. The method of claim 2,
    wherein the theme for the gamified user interface authentication display is implemented based on rules and graphical content of a defined game,
    wherein the rules of the defined game are associated with a plurality of defined interactions in the game scenario including the defined interaction to be received from the user, and
    wherein the gamified user interface authentication display simulates game play of the defined game using the rules and the graphical content in the game scenario.

4. The method of claim 2,
    wherein the theme for the gamified user interface authentication display is used in an interaction session with a financial institution to confirm validity of the interaction session, and
    wherein the theme for the gamified user interface authentication display includes a graphical object previously selected or provided from the user.

5. The method of claim 1,
    wherein the gamified user interface authentication display presents a plurality of options in the game scenario to perform entry of an personal identification code, the personal identification code including one or more alphanumeric characters or symbols,
    wherein the game scenario includes respective designated game play objects that select respective alphanumeric characters or symbols of the personal identification code, and
    wherein the defined interaction includes a user action in a defined game to interact with the respective designated game play objects to cause an input that matches the personal identification code.

6. The method of claim 1,
    wherein the security verification includes presentation of a security question with the customer financial transaction device and verification of a security answer for the security question to an answer received with the customer financial transaction device, and
    wherein the answer received with the customer financial transaction device is input by the user based on game objects provided in the presentation of the game scenario.

7. The method of claim 1, the plurality of electronic operations further including:
    performing a device-to-device communication between the customer financial transaction device and a mobile device of the user prior to receiving the user input, wherein the defined interaction is based on information communicated to the mobile device in the device-to-device communication.

8. The method of claim 1,
    wherein the customer financial transaction device is an automatic teller machine or kiosk, wherein the customer financial transaction device includes a touchscreen display unit adapted to output the gamified user interface authentication display and receive the user input in the gamified user interface authentication display, and wherein authenticating the user in the session enables performance of a user-controlled electronic financial transaction with the customer financial transaction device.

9. A non-transitory device-readable storage medium, the device-readable storage medium including instructions that, when executed by a processor and memory of a customer financial transaction device, causes the customer financial transaction device to perform operations that:

designate a defined interaction to be received from a user in a session with the customer financial transaction device, the defined interaction provided from authentication input in a game scenario of a gamified user interface authentication display;

receive a user input from the user with the customer financial transaction device in connection with a presentation of the game scenario with the gamified user interface authentication display;

evaluate the user input received with the customer financial transaction device to determine whether the user input corresponds to the defined interaction;

authenticate the user in the session in response to determining that the user input received with the customer financial transaction device corresponds to the defined interaction; and performing a security verification in response to determining that the user input received with the customer financial transaction device does not correspond to the defined interaction;

wherein authenticating the user in the session occurs in response to additionally successfully performing the security verification; and wherein the security verification includes verification of biometric information of the user, the biometric information obtained from a biometric scan of the user performed in connection with the receiving of the user input with the customer financial transaction device in connection with the presentation of the game scenario.

10. The device-readable storage medium of claim 9, wherein the instructions also cause the customer financial transaction device to perform operations that:

implement a theme for the gamified user interface authentication display, the theme defining a plurality of user interface components for the game scenario of the gamified user interface authentication display that enable a performance of the defined interaction.

11. The device-readable storage medium of claim 10, wherein the theme for the gamified user interface authentication display is implemented based on rules and graphical content of a defined game, wherein the rules of the defined game are associated with a plurality of defined interactions in the game scenario including the defined interaction to be received from the user, and wherein the gamified user interface authentication display simulates game play of the defined game using the rules and the graphical content in the game scenario.

12. The device-readable storage medium of claim 10, wherein the theme for the gamified user interface authentication display is used in an interaction session with a financial institution to confirm validity of the interaction session, and wherein the theme for the gamified user interface authentication display includes a graphical object previously selected or provided from the user.

13. The device-readable storage medium of claim 9, wherein the gamified user interface authentication display presents a plurality of options in the game scenario to perform entry of an personal identification code, the personal identification code including one or more alphanumeric characters or symbols, wherein the game scenario includes respective designated game play objects that select respective alphanumeric characters or symbols of the personal identification code, and wherein the defined interaction includes a user action in a defined game to interact with the respective designated game play objects to cause an input that matches the personal identification code.

14. The device-readable storage medium of claim 9, wherein the security verification includes presentation of a security question with the customer financial transaction device and verification of a security answer for the security question to an answer received with the customer financial transaction device, and wherein the answer received with the customer financial transaction device is input by the user based on game objects provided in the presentation of the game scenario.

15. The device-readable storage medium of claim 9, wherein the instructions also cause the customer financial transaction device to perform operations that:

perform a device-to-device communication between the customer financial transaction device and a mobile device of the user prior to receiving the user input, wherein the defined interaction is based on information communicated to the mobile device in the device-to-device communication.

16. A computing system, comprising:

a processor; and a memory device comprising instructions stored thereon, which when executed by the processor, configure the processor to perform electronic operations with a user interface of the computing system that:

designate a defined interaction to be received from a user in a session with the computing system, the defined interaction provided from authentication input in a game scenario of a gamified user interface authentication display;

receive a user input from the user with the computing system in connection with a presentation of the game scenario with the gamified user interface authentication display;

evaluate the user input received with the computing system to determine whether the user input corresponds to the defined interaction;

authenticate the user in the session in response to determining that the user input received with the computing system corresponds to the defined interaction; and performing a security verification in response to determining that the user input received with the customer financial transaction device does not correspond to the defined interaction;

wherein authenticating the user in the session occurs in response to additionally successfully performing the security verification; and wherein the security verification includes verification of biometric information of the user, the biometric information obtained from a biometric scan of the user performed in connection with the receiving of the user input with the customer financial transaction device in connection with the presentation of the game scenario.

17. The computing system of claim 16, further comprising:
storage hardware implementing a plurality of databases, the plurality of databases including:
a user interface theme database, the user interface theme database to provide theme data for use in the user interface;
a gamification definition database, the gamification definition database to provide definitions including a plurality of defined interactions for the user interface, the plurality of defined interactions including the defined interaction evaluated from the gamified user interface authentication display;
a transaction database, the transaction database to provide transaction data for use in a plurality of electronic financial transactions initiated in the user interface; and
an authentication database, the authentication database to provide authentication data for additional authentication of the user in the user interface; and
wherein the instructions further configure the processor to implement a theme for the gamified user interface authentication display using the theme data, the theme defining a plurality of user interface components for the game scenario of the gamified user interface authentication display that enable a performance of the defined interaction.

18. The computing system of claim 17,
wherein the instructions further configure the processor to perform financial operations based on the data in the plurality of databases;
wherein the theme for the gamified user interface authentication display is implemented based on rules and graphical content of a defined game, the rules of the defined game being associated with the plurality of defined interactions; and
wherein the gamified user interface authentication display simulates game play of the defined game using the rules and the graphical content in the game scenario.

19. The computing system of claim 18, further comprising:
wherein the instructions further configure the processor to authenticate the user in the session with the computing system based on the data in the plurality of databases, and
wherein the computing system is an automatic teller machine or kiosk adapted to perform an electronic financial transaction upon request via input in the session with the computing system, and
wherein data for the plurality of databases is provided at least in part from a remote financial institution processing device connected to the computing system via a secure network.

20. The computing system of claim 18,
wherein the instructions further configure the processor to enable performance of a financial transaction with the computing system in response to successful authentication of the user in the session, and
wherein the computing system is an automatic teller machine or kiosk adapted to perform one or more electronic financial transactions upon request via input received in the session, and wherein data for the plurality of databases is provided from a remote financial institution processing device connected to the computing system via a secure network.

21. The computing system of claim 16, further comprising:
a touchscreen display unit including a display interface device and an input interface device;
wherein the computing system is an automatic teller machine or kiosk, the touchscreen display unit of the computing system adapted to output the gamified user interface authentication display and receive the user input in the gamified user interface authentication display; and
wherein the session is unique to the user, the session used to conduct one or more electronic financial transactions using the kiosk.

* * * * *